United States Patent [19]

Matsui

[11] Patent Number: 5,657,432
[45] Date of Patent: Aug. 12, 1997

[54] TEXTURE MAPPING METHOD FOR PLACING TEXTURE PIECES SUCCESSIVELY ON OBJECT

[75] Inventor: Kazuki Matsui, Kawasaki, Japan

[73] Assignee: Fujitsu Limited, Kawasaki, Japan

[21] Appl. No.: 305,786

[22] Filed: Sep. 14, 1994

[30] Foreign Application Priority Data

Oct. 1, 1993 [JP] Japan ................. 5-247071

[51] Int. Cl.$^6$ .............................. G06T 7/40
[52] U.S. Cl. .................. 395/129; 395/130; 395/131; 395/125
[58] Field of Search .................. 395/130, 125, 395/127, 126, 131, 133, 129; 382/205, 210, 215, 216, 285; 345/118, 121

[56] References Cited

U.S. PATENT DOCUMENTS

| | | | |
|---|---|---|---|
| 5,016,183 | 5/1991 | Shyong | 364/470 |
| 5,097,427 | 3/1992 | Lathrop et al. | 395/130 |
| 5,109,481 | 4/1992 | Lathrop et al. | 395/133 |
| 5,179,638 | 1/1993 | Dawson et al. | 395/125 |
| 5,222,205 | 6/1993 | Larson et al. | 395/130 |
| 5,230,039 | 7/1993 | Grossman et al. | 395/130 |
| 5,255,352 | 10/1993 | Falk | 395/125 |
| 5,333,245 | 7/1994 | Vecchione | 395/130 |
| 5,361,386 | 11/1994 | Watkins et al. | 395/130 |
| 5,369,736 | 11/1994 | Kato et al. | 395/125 |
| 5,412,765 | 5/1995 | Yamrom et al. | 395/130 |

OTHER PUBLICATIONS

Foley et al., *Computer Graphics: Principles and Practice*, Addison–Wesley Publishing Company, Inc., 1990, pp. 734–735.

Heckbert, "A Survey of Texture Mapping", *IEEE Computer Graphics and Application*, vol.6, No.11, Nov. 1986, pp.56–67.

Cowart, *Mastering Windows™ 3.1 Special Edition*, SYBEX Inc., pp. 168–173.

*Primary Examiner*—Heather R. Herndon
*Assistant Examiner*—Stephen Hong
*Attorney, Agent, or Firm*—Nikaido, Marmelstein, Murray & Oram LLP

[57] ABSTRACT

A fragment is extracted from a given texture comprising a texture image. A texture unit is then formed by connecting fragments either identical or similar to the fragment extracted from the given texture with one another so that a part of one fragment meets a corresponding part of another fragment in all meeting, and also so that, if texture units, each unit being identical to the thus formed texture unit, are connected with one another, a part of a fragment included in one texture unit meets a corresponding part of a fragment included in another texture unit in any texture unit meeting. The texture units are placed from side to side so as to cover a desired surface. For example, the fragment extracted from the given texture has a rectangle shape. In this case, the texture unit is formed by connecting fragments either identical or similar to the fragment extracted from the given texture with one another so that a side of one fragment meets a corresponding side of another fragment in all meeting, and also so that, if texture units, each unit being identical to the thus formed texture unit, are connected with one another, a side of a fragment included in one texture unit meets a corresponding side of a fragment included in another texture unit in any texture unit meeting.

22 Claims, 19 Drawing Sheets

FIG. 15A
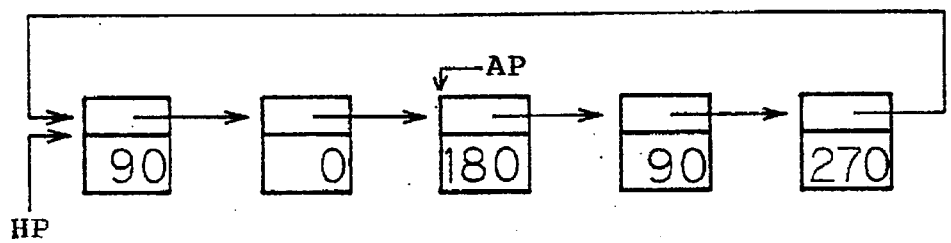
FIG. 15B
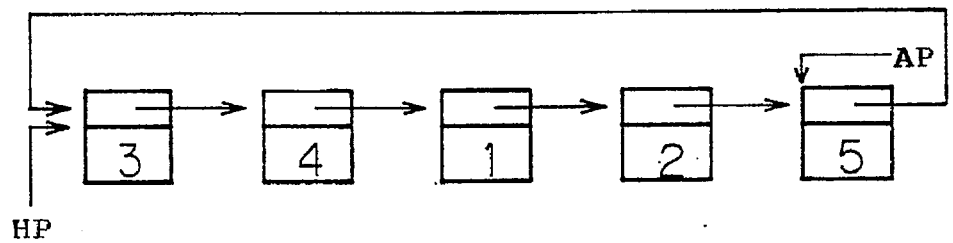
FIG. 15C
| SPECIFICATION VALUE | IMAGE SELECTION |
|---|---|
| 1 | IMAGE A |
| 2 | IMAGE B |
| 3 | IMAGE C |
| 4 | IMAGE A + IMAGE B |
| 5 | IMAGE A + IMAGE C |
| 6 | IMAGE A + IMAGE B + IMAGE C |

FIR. 16D 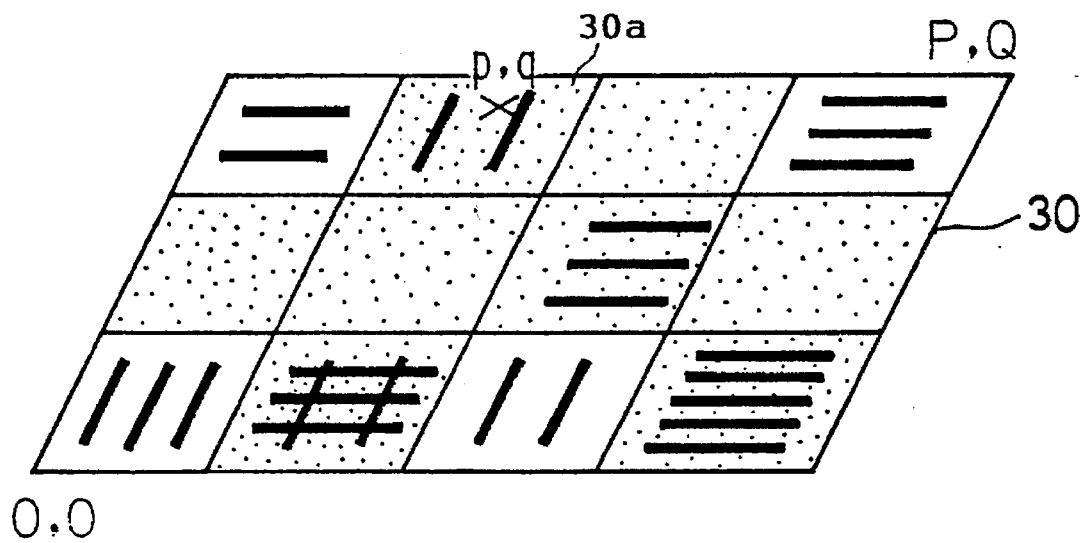

| V | IMAGE SELECTION | ROTATION ANGLE |
|---|---|---|
| 1 | C | 0 |
| 2 | A + B | 90 |
| 3 | B | 270 |
| 4 | A | 180 |
| 5 | A + C | 90 |
| ⋮ | ⋮ | ⋮ |

GUIDANCE 36

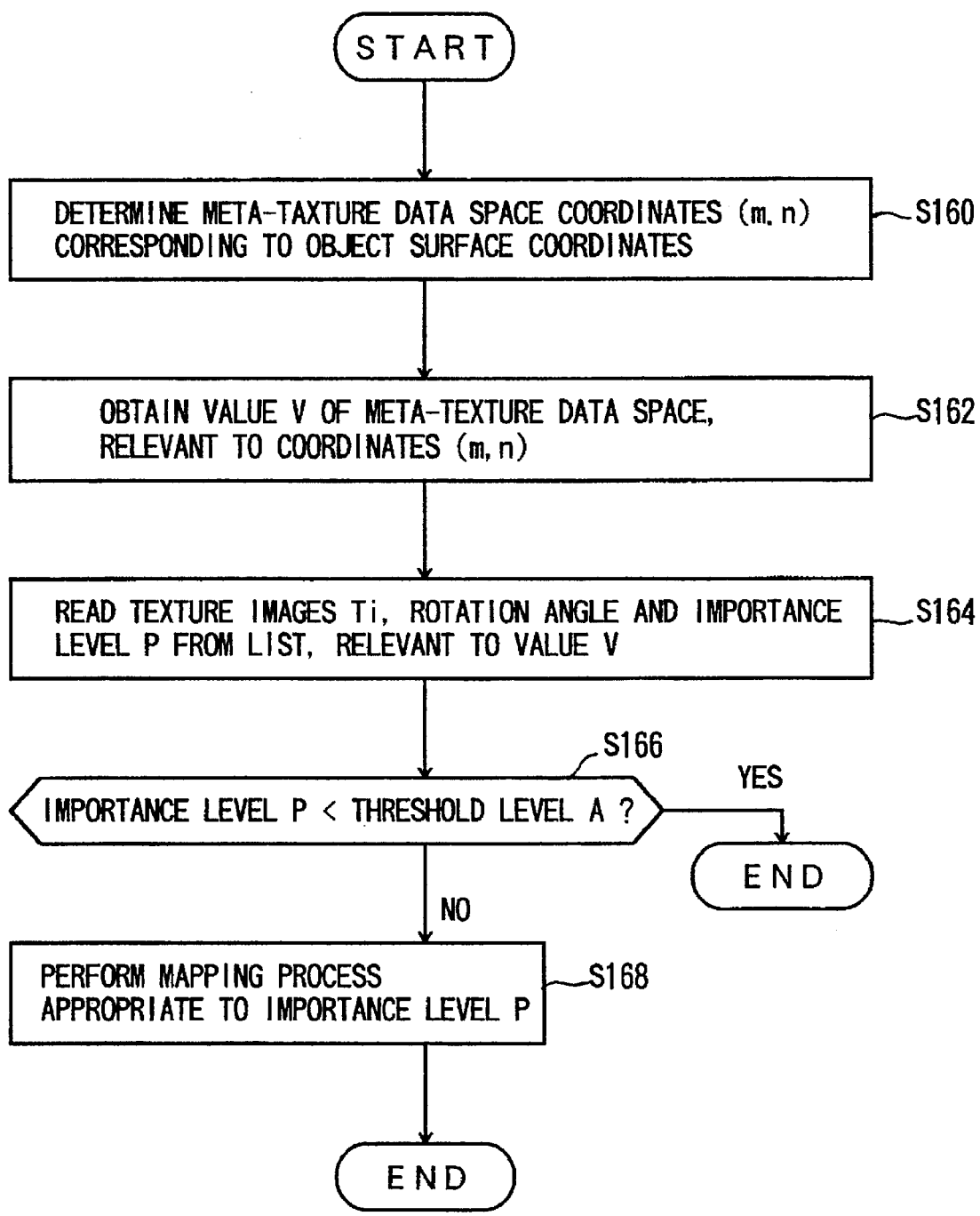

TEXTURE MAPPING METHOD FOR PLACING TEXTURE PIECES SUCCESSIVELY ON OBJECT

BACKGROUND OF THE INVENTION

1. Field of the Invention

The present invention relates to a texture mapping method.

The computer graphics field has been attempting to visibly represent, in a manner in which a user can easily understand relevant contents, geometric data produced through a computer-aided design (CAD). In such an attempt, a texture mapping technology may be used. The texture mapping technology will now be described. Through the texture mapping technology, it can be relatively easily realized that geometric data is visibly represented so that a represented image resembles a relevant real object. In the texture mapping technology, previously provided images are used to cover a represented object surface to be displayed. As an example of such a process, images are produced from photographs of a surface of the earth, and/or a road surface, and the thus produced images are used to cover a represented surface of the earth and/or road surface serving as a background of an image of a building, the building image being produced through CAD or the like. Such images used to cover such a desired object surface will be referred to as texture or texture images.

2. Related Art

In such a texture mapping method, as shown in FIG. 1A, a texture image 10 is mapped onto an area 11a of a surface of an object 11 so that the texture image 10 is placed on the area 11a of the surface of the object 11. Coordinates (u, v) of the texture image 10 in its image space correspond to coordinates (p, q) of the area 11a in the mapping. An operation of such a mapping process will now be described with reference to FIG. 1B. A step S2 (the term 'step' will be omitted, hereinafter) calculates the coordinates (p, q) in the area 11a. S4 calculates the corresponding coordinates (u, v) in the texture image 10 in its image space. S6 reads color data of the texture image 10 according to the thus calculated coordinates (u, v) and determines color data of a position specified by the coordinates (p, q) in the area 11a to be the thus read color data. Such a process is repeated for all coordinates in the area 11a so that the color data for all the area 11a on the object 11 is determined to be the corresponding color data of the texture image 10.

In the texture mapping method, a plurality of identical texture images 10 are placed on a desired object surface so that the object surface is covered thereby. Thus, as shown in FIG. 2, identical texture images 10, each image representing a pattern of a surface such as an earth surface, a road surface, a lawn surface or the like, are orderly and closely placed on a wide object surface 12 as shown in the figure for example. As a result, as shown in the figure, there appears periodicity in the object surface 12, such periodicity giving a strange impression adversely affecting real appearance of the object surface 12 and thus being an undesirable one. Causes of such periodicity include discontinuities occurring at each boundary between adjacent texture images 10 and repetition of the same patterns caused by repeatedly side-by-side arranged identical texture images 10.

SUMMARY OF THE INVENTION

An object of the present invention is to provide a texture mapping method in which such an undesirable periodicity is prevented from occurring on a resulting object surface although texture images are successively placed there.

In order to achieve the above object, a texture mapping method according to the present invention forms a texture unit (texture image) by connecting fragments either identical or similar to a fragment extracted from a given texture with one another so that a part of one fragment meets a corresponding part of another fragment in all meeting, and also so that, if texture units, each unit being identical to the thus formed texture unit, are connected with one another, a part of a fragment included in one texture unit meets a corresponding part of a fragment included in another texture unit in any texture unit meeting.

As a result, discontinuities are prevented from occurring at each boundary between adjacent texture units (texture images). Thus, the undesirable periodicity is prevented from appearing on the object surface covered by such texture units.

Another texture mapping method according to the present invention selects at least one texture unit, from among a previously provided plurality of texture units, according to a position of an area of a desired object surface and modifies an appearance of the texture unit according to the position of the area of the desired object surface.

The above method preferably mixes texture units comprising at least two texture units among texture units selected by said selecting step and texture units modified by said modifying step.

Another texture mapping method according to the present invention determines meta-texture data according to a position of an area of a desired object surface and processes a given texture unit according to said meta-texture data.

Thus, many sorts of texture units (texture images) having different patterns can be easily obtained from limited sorts of patterns. The different patterns are different but also have similarity so as to prevent the object surface covered by such different-pattern texture units (texture images) from appearing strange due to the difference. That is, such an object surface is normally a single sort of continuous surface such as a continuous lawn surface. Thus, if one texture unit among the texture units used to represent such a single sort of continuous surface is extremely different from an adjacent texture unit, a relevant area is so conspicuous on the surface that the matter also adversely affects a real appearance of the object surface. Thus, it is preferable that texture units to be used to cover the object surface are so different from one another that the undesirable periodicity can be prevented and also that the texture units are so similar that undesirable conspicuousness can be prevented from occurring on the surface covered by the texture units.

The above described texture mapping methods according to the present invention can achieve preferable effects such as described above due to the above-described steps for obtaining the texture units. Thus, these texture mapping methods are very practical.

Other objects and further features of the present invention will become more apparent from the following detailed description when read in conjunction with the accompanying drawings.

BRIEF DESCRIPTION OF THE DRAWINGS

FIGS. 15A, 15B and 15C illustrate the process shown in FIG. 14;

FIGS. 16A, 16B, 16C and 16D and illustrate the mapping process in the above fourth embodiment;

FIG. 19 shows an operation flow of a adaptable mapping process in the sixth embodiment of the texture mapping method according to the present invention.

DESCRIPTION OF THE PREFERRED EMBODIMENTS

Figure 3:
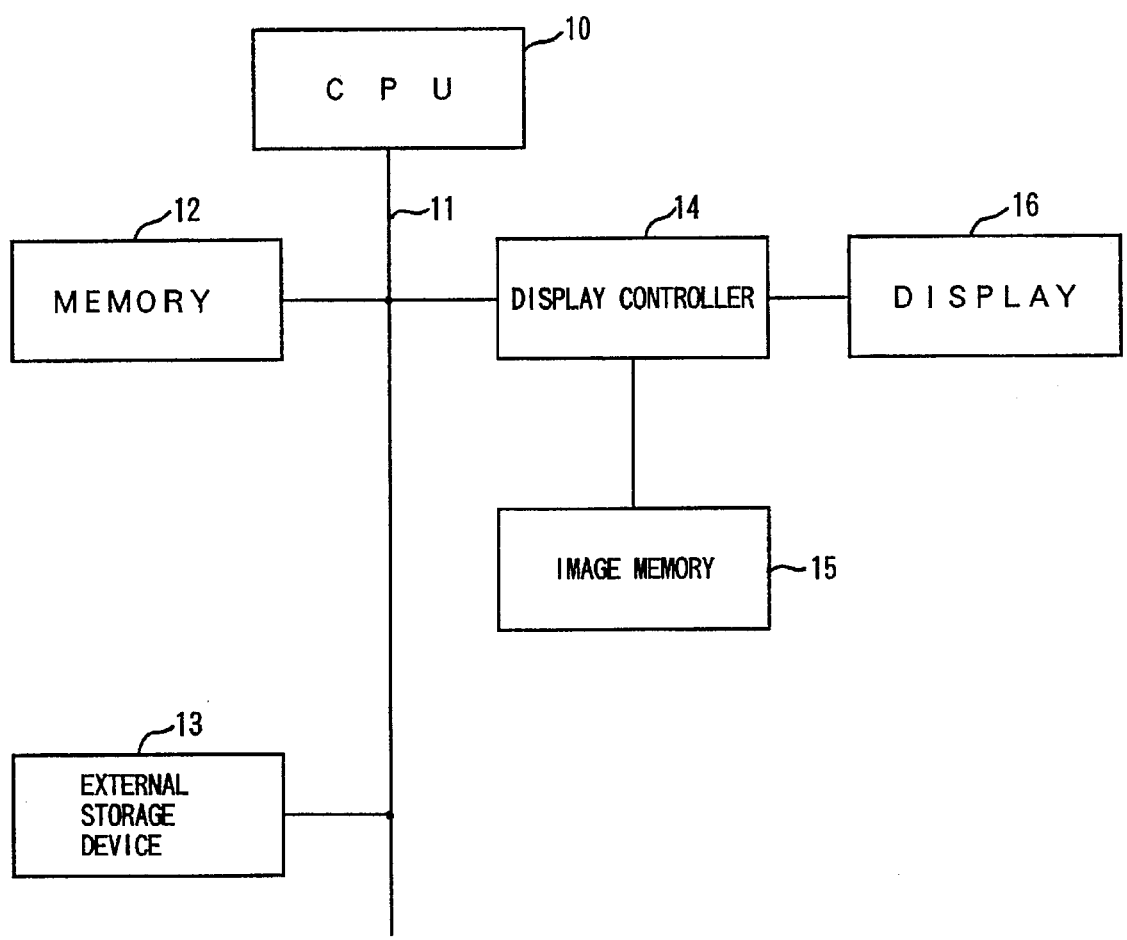
FIG. 3 shows a block diagram of an image processing system in a first, second, third, fourth, fifth, sixth embodiments of a texture mapping method according to the present invention.

With reference to FIG. 3, a general construction of an image processing system in first, second, third, fourth, fifth and sixth embodiments of a texture mapping method according to the present invention will now be described. A CPU 10 controls an entirety of the image processing system via a bus 11 and performs various sorts of processes including a texture mapping process. A memory 12 previously stores software programs for the CPU 10 to use in performing the processes and is also used as a work area for the texture mapping process. An external storage device 13 stores data representing texture images and a desired object surface on which the texture images will cover. A display controller 14 displays an image stored in the image memory 15 through a display 16.

Figure 4:
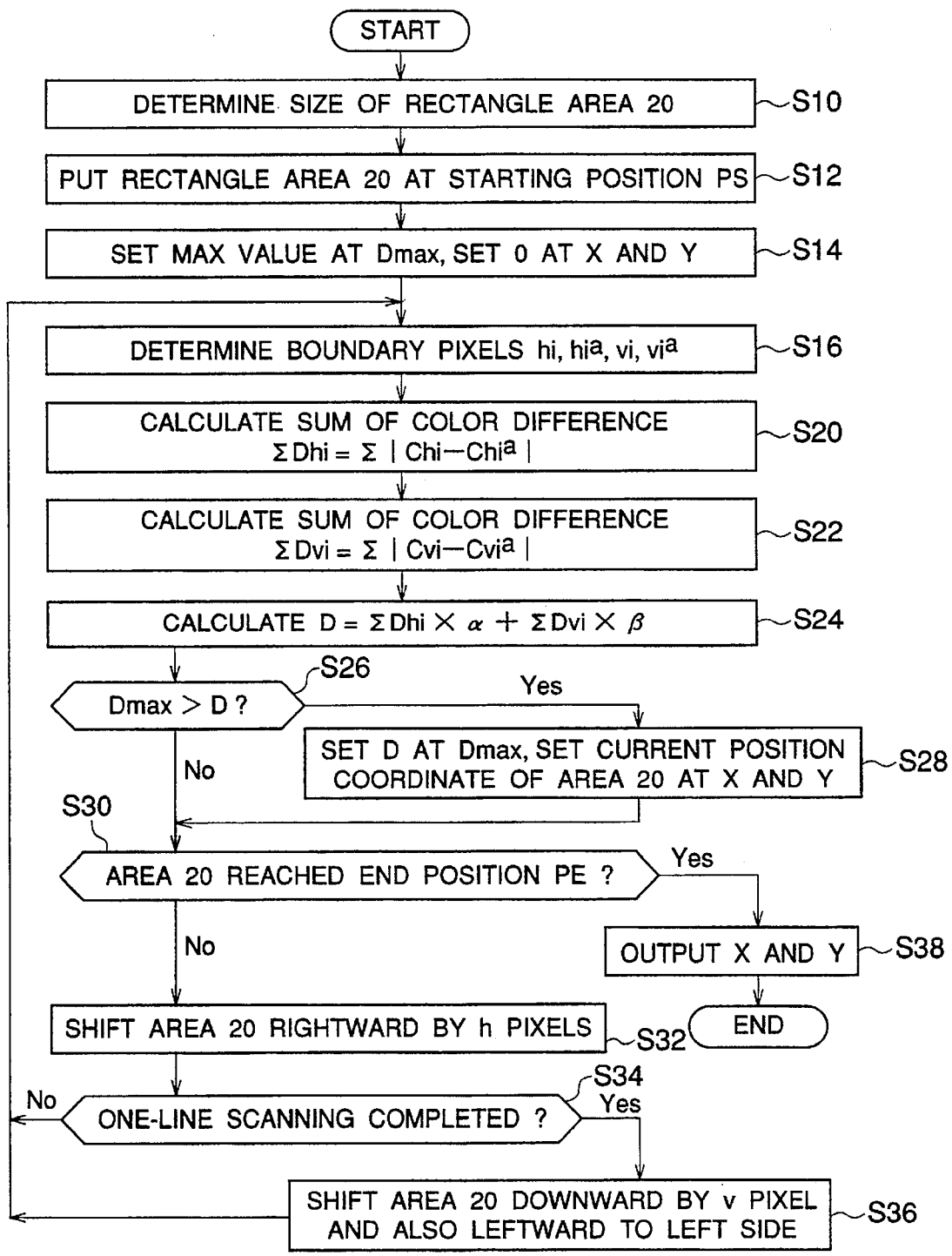
FIG. 4 shows an operation flow of a texture rectangle area determining process in the first embodiment of the texture mapping method according to the present invention.
Figure 5:
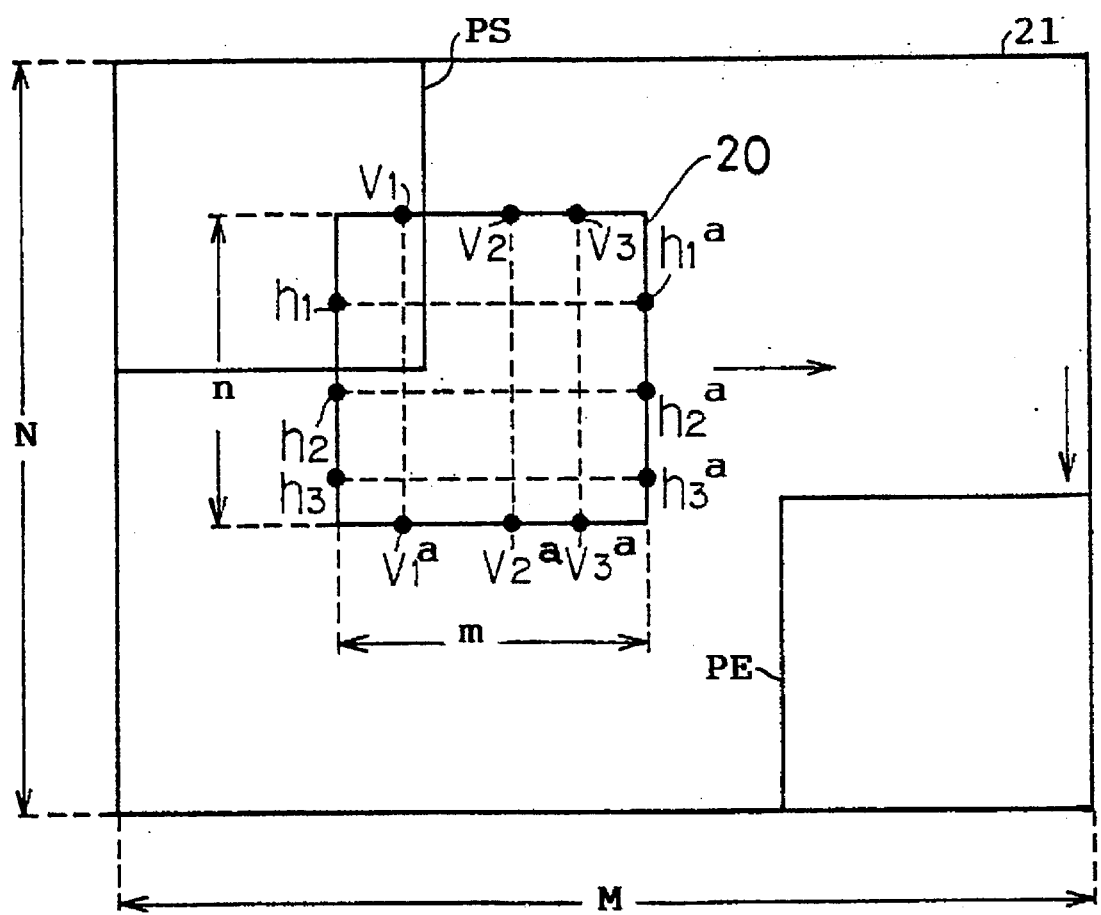
FIG. 5 illustrates the process shown in FIG. 4.

With reference to FIGS. 4 and 5, an operation flow of a texture rectangle-area determining process in the first embodiment of the present invention will now be described. In the process, the CPU 10 transfers data representing original texture image 21, shown in FIG. 5, previously stored in the external storage device 13, from the device 13 to the memory 12. The original texture image 21 has a rectangle shape having a size of N pixels×M pixels as shown in the figure. S10 determines the size of a rectangle area 20 as that of n pixels×m pixels as shown in FIG. 5. A purpose of determining such a rectangle area will be described later with reference to FIGS. 10A through 10I. S12 puts the thus size-determined rectangle area 20 at a starting position PS (a top-left corner in the figure) of the original texture image 21 as shown in FIG. 5. S14 sets a variable Dmax of a predetermined maximum value and sets to 0 (initializes) each of variables X and Y.

S16 determines boundary pixels $hi$, $hi^a$, $vi$ and $vi^a$ among pixels constituting the original texture image 21, each pixel located on a boundary of the rectangle area 20 set at the position PS. The number and positions of the boundary pixels may be arbitrarily determined by a user. It is preferable that these boundary pixels are scattered uniformly over the boundary of the rectangle area 20. In the FIG. 5 example, the suffix i of the boundary pixels $hi$, $hi^a$, $vi$ and $vi^a$ is 1, 2 and 3 as shown in the figure. If i is the same, $hi$ and $hi^a$ have a same height, and $vi$ and $vi^a$ are present on a same vertical line. S20 calculates a sum $\Sigma Dhi$ of differences between the color value $Chi$ of the pixel $hi$ and a color value $Chi^a$ of the pixel $hi^a$ for i=1 through 3. S22 calculates a sum $\Sigma Dvi$ of differences between a color value $Cvi$ of the pixel $vi$ and a color value $Cvi^a$ of the pixel $vi^a$ for i=1 through 3. S24 calculates a variable D using weights $\alpha$ and $\beta$ ($\alpha+\beta=1$, for example) by the following equation:

$$D=\Sigma Dhi\cdot\alpha+\Sigma Dvi\cdot\beta.$$

S26 determines whether or not Dmax>D. Only if Dmax>D, S28 sets the value of D at the value of the variable Dmax and sets x and y coordinate values of a top-left corner position of the rectangle area 20 at the value of the variables X and Y. S30 determines whether or not the rectangle area 20 has reached an ending position (a bottom-right corner of the figure) PE of the original texture image 21 shown in FIG. 5. S30 determines that the area 20 has not yet reached the position PE since the rectangle area 20 is at the starting position PS. S32 shifts the rectangle area 20 rightward by a distance of predetermined h pixels. S34 determines whether or not scanning of the original texture image 21 by the rectangle area 20 has been completed for a current height. If the current-height scanning has not yet been completed in S34, the above process S16, S20, S22, S24, S26, S28, S30 and S32 is repeated until the current-height scanning is completed. If the current-height scanning has been thus completed in S34, S36 shifts the rectangle area 20 downward by a distance of predetermined v pixels and shifts the rectangle area 20 leftward so that a left side of the rectangle area 20 overlaps a left side of the original image 21. Then, the above process, including the above repeating process of S16, S20, S22, S24, S26, S28, S30, S32, S34 and S36 is repeated until the entire area of the original texture image 21 is scanned by the rectangle area 20. If S30 determines that the rectangle area 20 has thus reached the ending position PE, S38 outputs a current values of X and Y, the process for the original texture image 21 having been thus completed. Thus, the resulting values X and Y indicate the x and y coordinates of the top-left corner of the rectangle area 20 when the rectangle area 20 is set at the position at which the variable D, obtained by the above equation:

$$D=\Sigma Dhi\cdot\alpha+\Sigma Dvi\cdot\beta,$$

is a minimum value. Thus, the position of the rectangle area 20 in the original texture image 21 can be determined, at which position the boundary pixels have a minimum color-value difference. An area of the original texture image 21 will be used to form a symmetrical-structure texture image as will be described with reference to FIGS. 10A through 10I, the above area of the original texture image 21 being the rectangle area 20 set at the position determined as described above through the process shown in FIG. 4.

Figure 6:
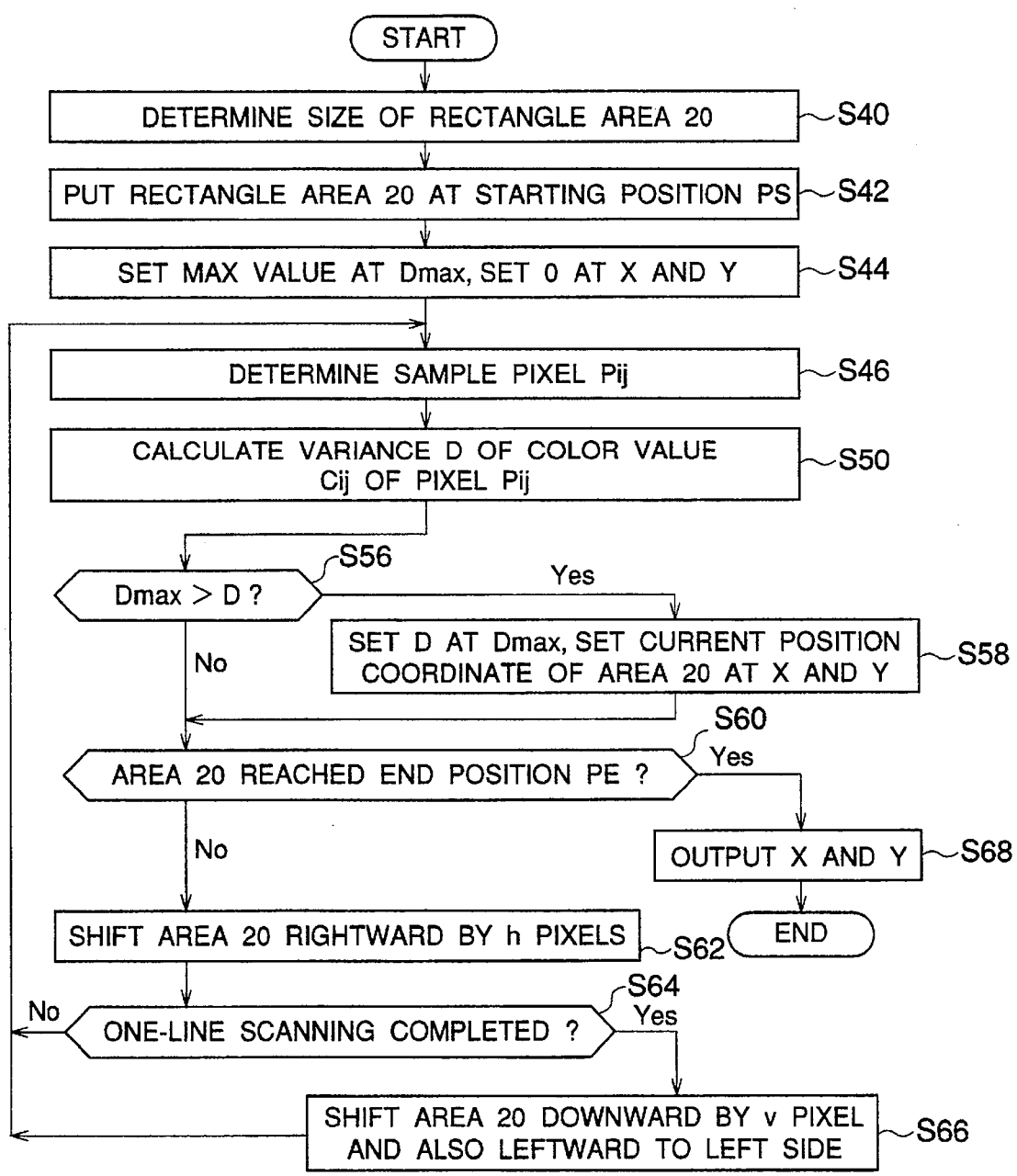
FIG. 6 shows an operation flow of a texture rectangle area determining process in the second embodiment of the texture mapping method according to the present invention.
Figure 7:
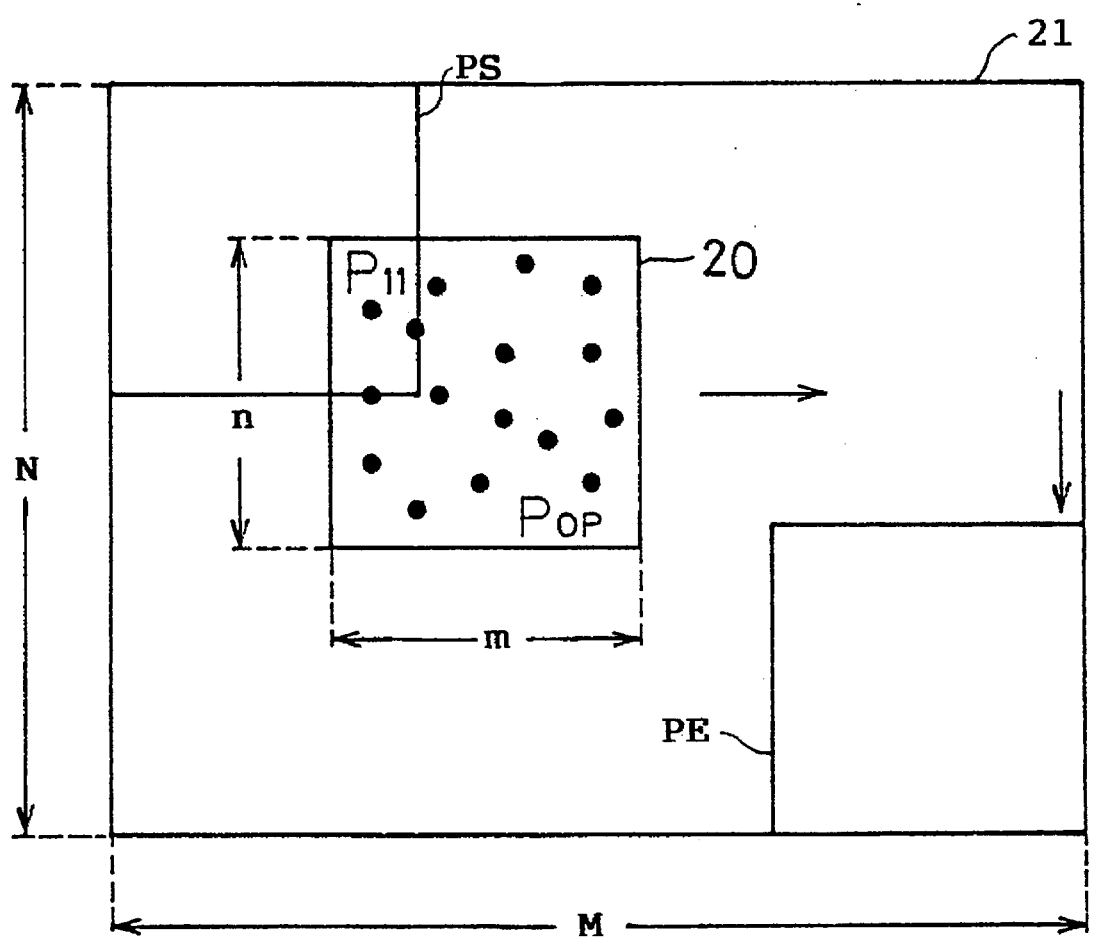
FIG. 7 illustrates the process shown in FIG. 6.

With reference to FIGS. 6 and 7, an operation flow of a texture rectangle-area determining process in the second embodiment of the present invention will now be described. However, as shown in FIG. 6, an initialization process indicated by S40, S42 and S44 shown in FIG. 6 is identical to that indicated by S10, S12 and S14 shown in FIG. 4, excepting a value at which the variables Dmax is set. The variable Dmax is predetermined appropriately in conjunction with values at which a variance D, calculated in S50, is set. Further, a process indicated by S56, S58, S60, S62, S64, S66, and S68 is identical to that indicated by S26, S28, S30, S32, S34, S36 and S38, excepting values at which the variance D, the other variables Dmax, X and Y are set during the process. The above process indicated by S56, S58, S60, S62, S64, S66, and S68 will now be simply described. S56 compares the variance D with the variable Dmax in S56; if Dmax>D in S56, S58 sets a current value of variance D at the value of the variable Dmax and sets current x and y coordinate values of the top-left corner position of the rectangle area 20 at the variable of the variable X and Y; S62, S64 and S66 scan the texture image 21 with the rectangle area 20 from the starting position PS to the ending position PE; S60 checks completion of the scanning; and S66 outputs final values. Thus, a description of the identical process will be omitted.

S46 determines a plurality of sample pixels Pij, numbers and positions of the pixels Pij in the rectangle area 20 having been determined arbitrarily by a user. It is preferable that these sample pixels are scattered uniformly over the rectangle area 20. S50 calculates the variance D taken for color values Cij of the sample pixels Pij among the pixels constituting the original texture images 21.

After the operation flow shown in FIG. 6 has been finished, the resulting values X and Y indicate the x and y coordinates of the top-left corner of the rectangle area 20 when the rectangle area 20 is set at a position at which the variance D is a minimum value. Thus, the position of the rectangle area 20 in the original texture image 21 can be determined, at which position the sample pixels have a minimum color-value variance. An area of the original texture image 21 will be used to form the symmetrical-structure texture image as will be described with reference to FIGS. 10A through 10I, the above area of the original texture image 21 being the rectangle area 20 set at the position determined as described above through the process shown in FIG. 6.

Figure 8:
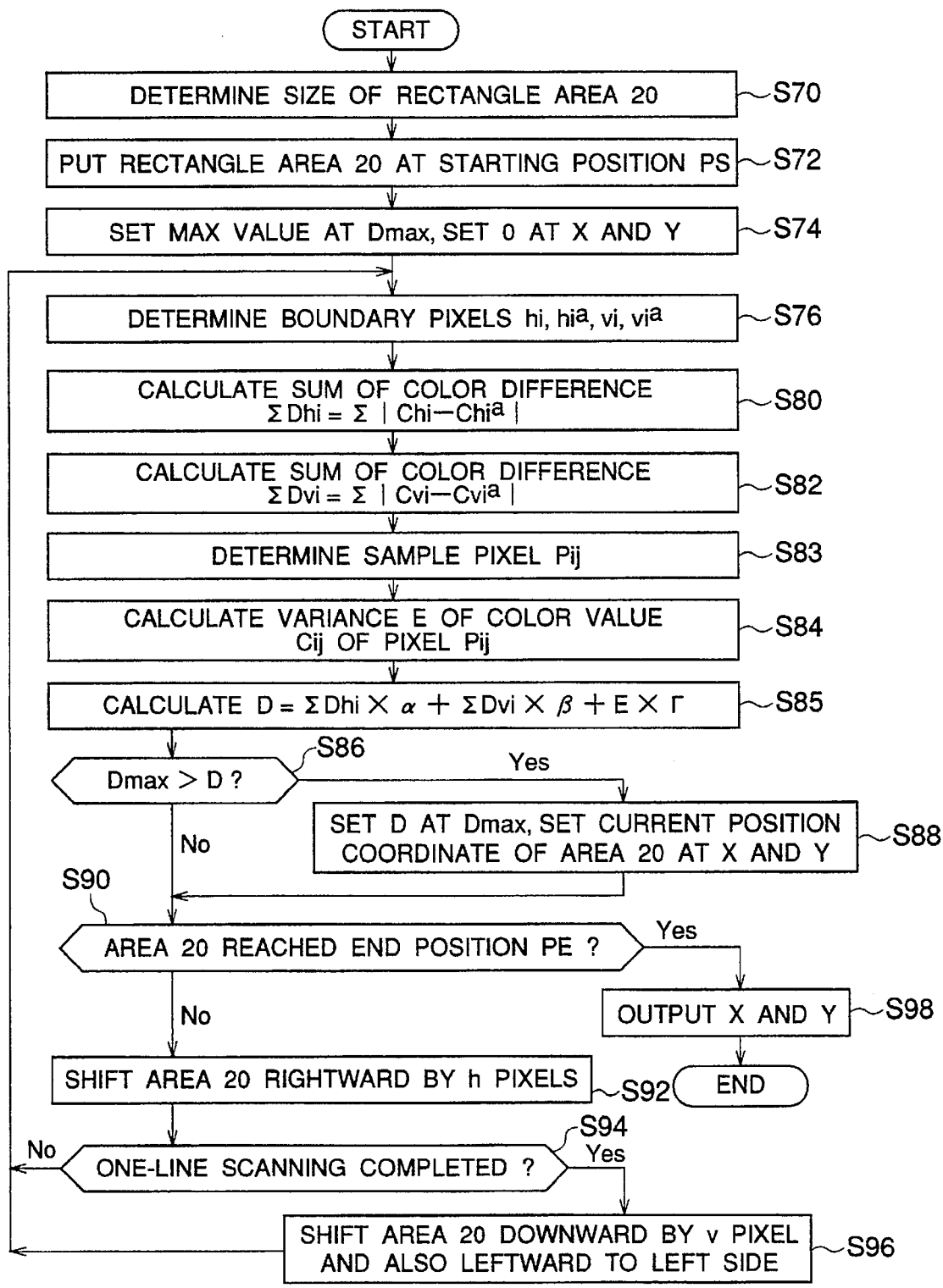
FIG. 8 shows an operation flow of a texture rectangle area determining process in the third embodiment of the texture mapping method according to the present invention.
Figure 9:
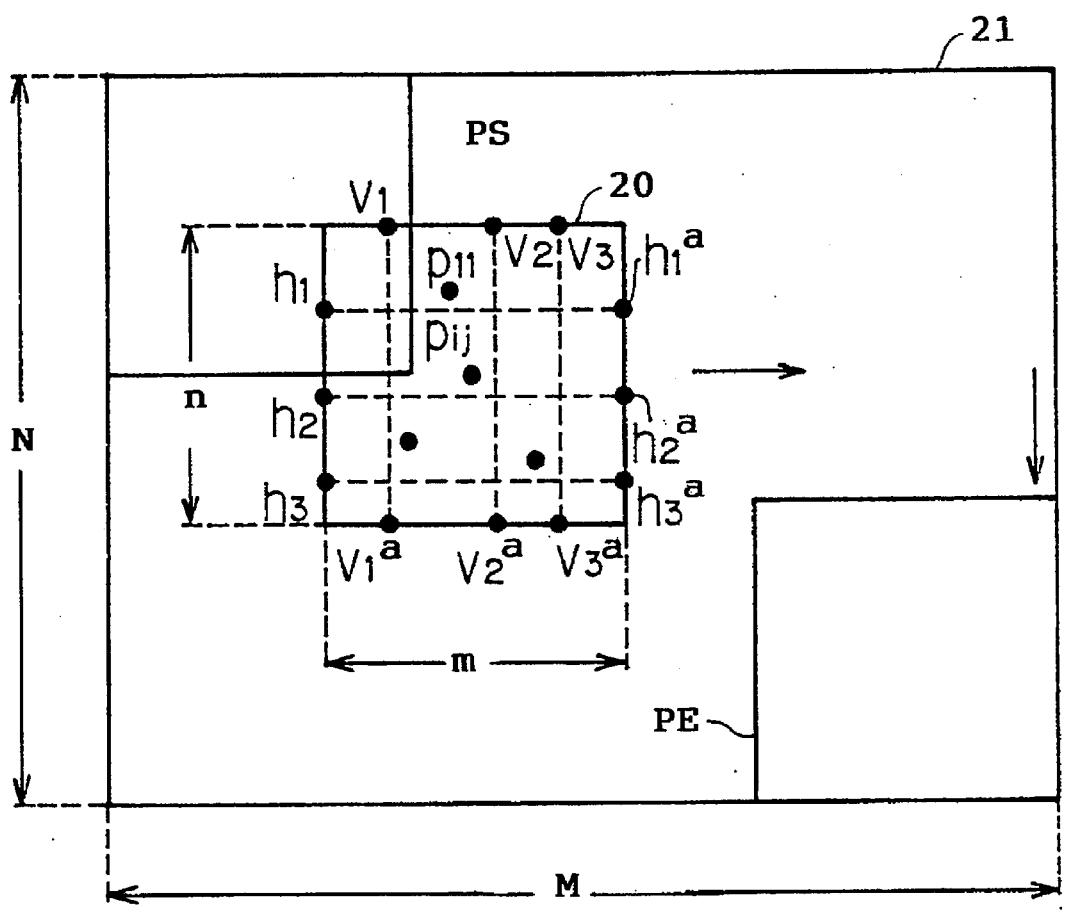
FIG. 9 illustrates the process shown in FIG. 8.

With reference to FIGS. 8 and 9, an operation flow of a texture rectangle-area determining process in the third embodiment of the present invention will now be described. However, as shown in FIG. 8, an initialization process indicated by S70, 72 and 74 shown in FIG. 8 is identical to that indicated by S10, S12 and S14 shown in FIG. 4, excepting a value at which the variable Dmax is set. The variable Dmax is predetermined appropriately in conjunction with values at which the variable D, calculated in S85, is set. Further, a process indicated by S86, S88, S90, S92, S94, S96, and S98 is identical to that indicated by S26, S28, S30, S32, S34, S36 and S38, excepting values at which the variables D, Dmax, X and Y are set during the process. The above process indicated by S86, S88, S90, S92, S94, S96, and S98 will now be simply described. S86 compares the variable D with the variable Dmax in S86; if Dmax>D in S86, S88 sets a current value of variable D at the value of the variable Dmax and sets current x and y coordinate values of the top-left corner position of the rectangle area 20 at the values of the variables X and Y; S92, S94 and S96 scan the texture image 21 with the rectangle area 20 from the starting position PS to the ending position PE; S90 checks completion of the scanning; and S96 outputs the final values. Thus, a description of the identical process will be omitted.

S76 determines boundary pixels hi, $hi^a$, vi and $vi^a$ among pixels constituting the original texture image 21, each pixel located on a boundary of the rectangle area 20 set at the position PS. The number and positions of the boundary pixels may be arbitrarily determined by a user. It is preferable that these boundary pixels are scattered uniformly over the boundary of the rectangle area 20. In the FIG. 9 example, similar to the FIG. 5 example, the suffix i of the boundary pixels hi, $hi^a$, vi and $vi^a$ is 1, 2 and 3 as shown in the figure. If i is the same, hi and $hi^a$ have a same height, and vi and $vi^a$ are present on a same vertical line. S80 calculates a sum $\Sigma Dhi$ of differences between the color value Chi of the pixel hi and a color value $Chi^a$ of the pixel $hi^a$ for i=1 through 3. S82 calculates a sum $\Sigma Dvi$ of differences between a color value Cvi of the pixel vi and the color value $Cvi^a$ of the pixel $vi^a$ for i=1 through 3.

S83 determines a plurality of sample pixels Pij, numbers and positions of the pixels Pij in the rectangle area 20 having been determined arbitrarily. It is preferable that these sample pixels are scattered uniformly over the rectangle area 20. S84 calculates the variance E taken for color values Cij of the sample pixels Pij among the pixels constituting the original texture images 21.

S85 calculates the value at which the variable D is set by the following equation:

$$D=\Sigma Dhi\cdot\alpha+\Sigma Dvi\cdot\beta+E\cdot\Gamma;$$

where weighting coefficients $\alpha$, $\beta$ and $\Gamma$ are predetermined values such that $\alpha+\beta+\Gamma=1$ for example.

After the operation flow shown in FIG. 8 has been finished, the resulting values X and Y indicate the x and y coordinates of the top-left corner of the rectangle area 20 when the rectangle area 20 is set at a position at which the color-value dispersion D taken for the pixels located all over the rectangle area 20 including the boundary thereof is a minimum value. Thus, the position of the rectangle area 20 in the original texture image 21 can be determined, at which position the sample pixels have a minimum color-value dispersion. An area of the original texture image 21 will be used to form the symmetrical-structure texture image as will be described with reference to FIGS. 10A through 10I, the above area of the original texture image 21 being the rectangle area 20 set at the position determined as described above through the process shown in FIG. 8.

It is possible to directly use a rectangle area of an original texture image, such as the rectangle area 20 of the original texture image 21, determined through any of the above-described texture rectangle-area determining processes in the first, second and third embodiments. That is, the thus determined rectangle area of the original texture image is used as a reference texture image, texture images identical to the reference texture image being placed on a desired object surface so that the surface is covered by the identical images.

Figure 10A:
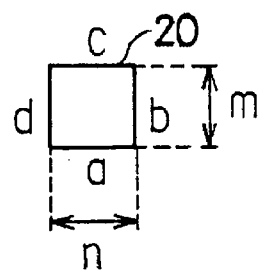
FIGS. 10A, 10B, 10C, 10D, 10E, 10F, 10G, 10H and 10I illustrate symmetrical-structure texture images.

With reference to FIGS. 10A through 10I, formation of symmetrical-structure texture images used in any of the first, second and third embodiments of the texture mapping method according to the present invention will now be described. The symmetrical-structure texture images such as those shown in FIGS. 10B through 10I are formed using a rectangle area 20 of the original texture image 21, shown in FIG. 10A, obtained through a rectangle-area determining process such as any one of the processes described above with reference to FIGS. 4, 5, 6, 7, 8 and 9. Formation of the symmetrical-structure image is carried out by the CPU 10 shown in FIG. 3. In general, each symmetrical-structure texture image is formed by forming a figure symmetrical to the rectangle area 20 of the original texture image and combining the thus-formed figure with the rectangle area 20 of the original texture image. Four sides of the rectangle area 20 of the original texture image will be referred to as a, b, c and d as shown in FIG. 10A. The rectangle area 20 has the size of n pixels×m pixels as described above. Each of the symmetrical-structure texture images shown in FIGS. 10B through 10E has a common size of 2n pixels×2m pixels as shown in the figures since each image consists of four rectangle areas including the rectangle area 20 shown as being dotted in each figure and three other figures, each having the size of n pixels×m pixels.

Figure 10B:
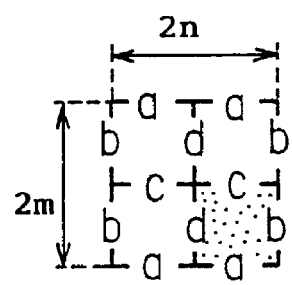

The symmetrical-structure texture image shown in FIG. 10B is formed as described below. A first symmetrical rectangle symmetrical, with respect to a first symmetrical axis corresponding to the side c of the rectangle area 20, to the rectangle area 20 is formed immediately above the rectangle area 20. Thus, a first combination rectangle is formed consisting of the rectangle area 20 and the first symmetrical rectangle being in contact with the first symmetrical axis. Then, a second symmetrical rectangle symmetrical, with respect to a second symmetrical axis corresponding to the side d of the rectangle area 20 and the side d of the above symmetrical rectangle (such a combined side will be referred to as side d—d or the like, hereinafter), is formed immediately left of the first combination rectangle. Thus, a second combination rectangle is formed consisting of the first combination rectangle and the second symmetrical rectangle being in contact with the second symmetrical axis.

As a result, as shown in FIG. 10B, the resulting second combination rectangle, being referred to as a symmetrical-structure texture image, is symmetrical with respect to the first symmetrical axis corresponding to the side c of the rectangle area 20 and the side c of the lower rectangle of the second symmetrical rectangle. The above symmetrical-structure texture image is also symmetrical with respect to the second symmetrical axis corresponding to the side d—d of the first combination rectangle. The symmetrical-structure texture image has top and bottom opposite sides a—a and a—a and left and right opposite sides b—b and b—b as shown in FIG. 10B. Thus, texture images identical to the above symmetrical-structure texture image shown in FIG. 10B are used to cover a desired object surface. Meeting sides of any pair of adjacent texture images consists of either the corresponding a—a sides or the corresponding b—b sides. That is, there are no cases where non-corresponding sides of adjacent texture images meet one another, the boundary being thus continuous in patterns of the texture images. Thus, there is no strange appearance due to pattern discontinuities present at boundaries between adjacent texture images. Similar effects can be obtained if using any of the symmetrical structure texture images shown in FIGS. 10B through 10E accordingly.

Figure 1A:
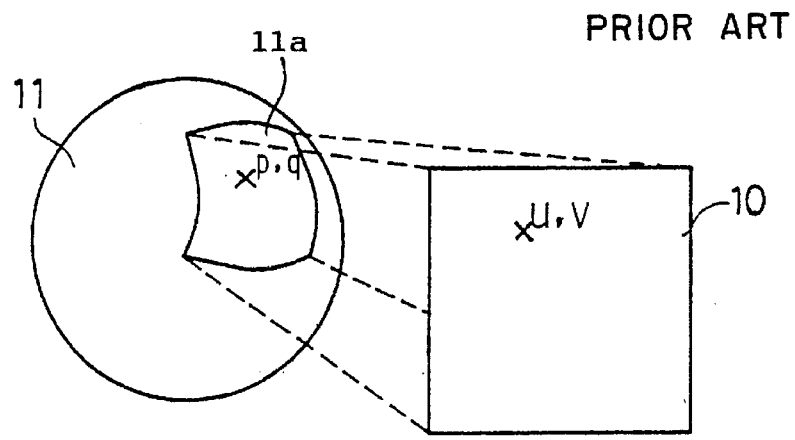
FIG. 1A illustrates a basic concept of a texture mapping method.
Figure 1B:
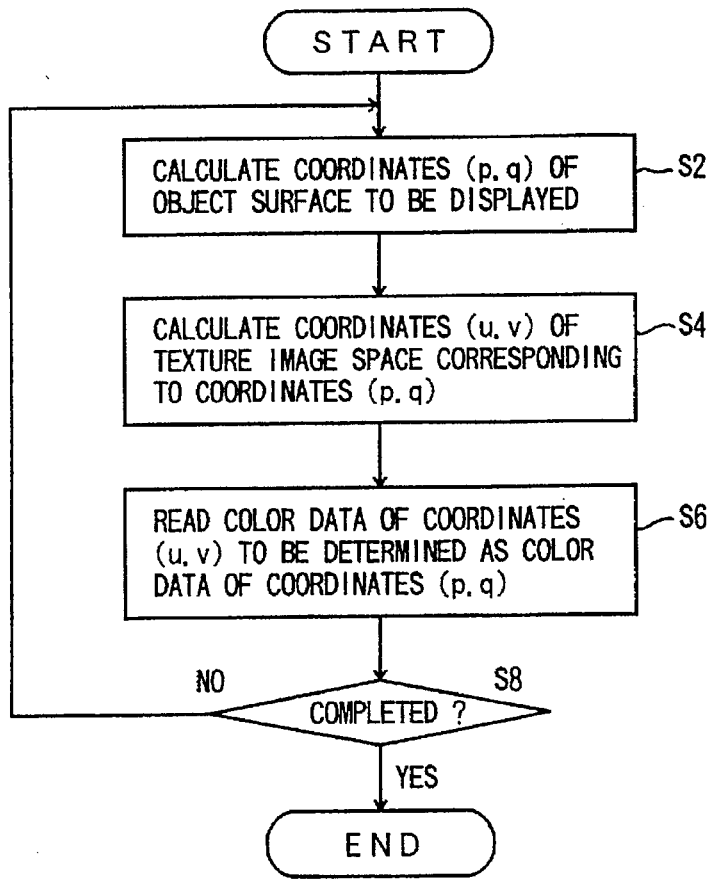
FIG. 1B shows an operation flow realizing the concept illustrated in FIG. 1A.
Figure 2:
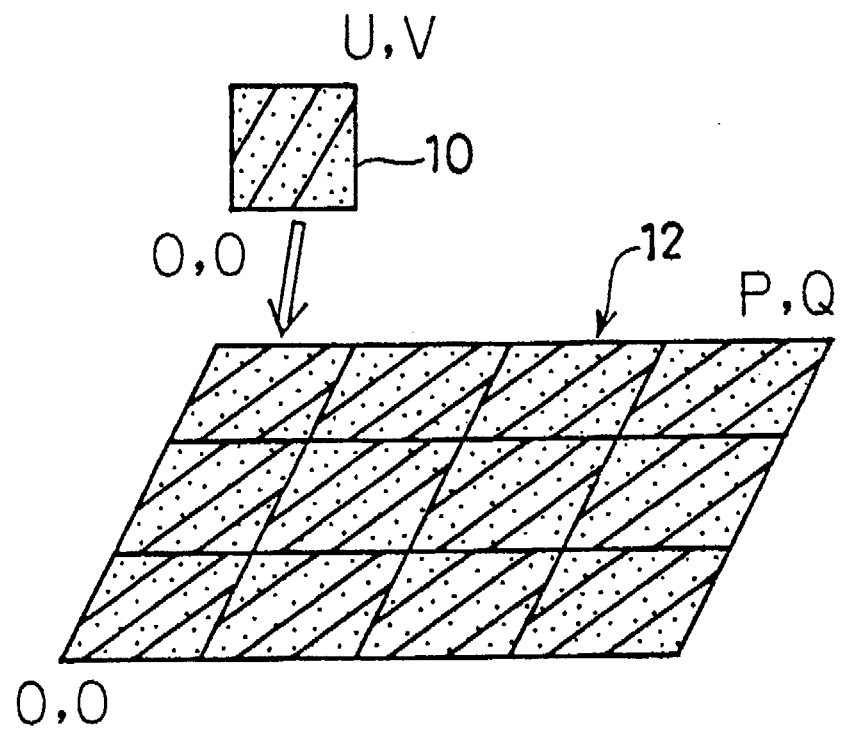
FIG. 2 illustrates a texture mapping method in the related art.
Figure 10C:
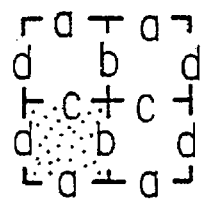
Figure 10D:
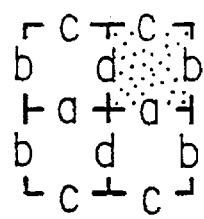
Figure 10E:
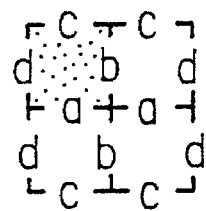
Figure 10F:
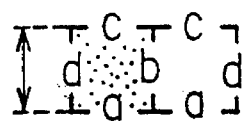
Figure 10G:
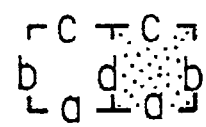
Figure 10H:
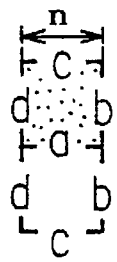
Figure 10I:
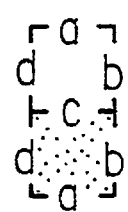

Each of the symmetrical-structure texture images shown in FIGS. 10C, 10D and 10E is formed similarly to the formation of that shown in FIG. 10B. However, instead of the first and second symmetrical axes being c—c and d—d as in the symmetrical-structure texture image shown in FIG. 10B, the first and second symmetrical axes are c—c and b—b in FIG. 10C, a—a and d—d in FIG. 10D and a—a and b—b in FIG. 10E. Further, each of the symmetrical-structure texture images shown in FIGS. 10F, 10G, 10H and 10I is formed by using only a first symmetrical axis, such as the side c in the FIG. 10B case, a final formation of the symmetrical-structure texture image thus consisting of the rectangle area 20 and a first symmetrical rectangle being in contact with the first symmetrical axis. Thus, the first combination rectangle constitutes the symmetrical-structure texture image. The first symmetrical axes in the symmetrical structure texture images shown in FIGS. 10F, 10G, 10H and 10I are b, d, a and c, respectively. If the symmetrical-structure texture image shown in FIG. 10F, for example, is used, the image has top and bottom opposite sides c—c and a—a, and left and right opposite sides d and d. Thus, if texture images identical to the symmetrical-structure texture image are used to cover a desired surface, meeting sides between any adjacent texture images consists of the corresponding sides d and d and non-corresponding sides a—a and c—c. Thus, patterns of adjacent texture images are continuous through the corresponding meeting sides d and d and discontinuous through the non-corresponding meeting sides a—a and c—c. Thus, there remains a strange appearance due to pattern discontinuities present at the boundary consisting of non-corresponding sides a—a and c—c. However, such a strange appearance can be reduced in comparison to the case where the rectangle area 20 shown in FIG. 10A is simply used so that texture images identical to the rectangle area 20 are used to cover a desired surface as shown in FIG. 2. Similar effects can be obtained if using any of the symmetrical-structure texture images shown in FIGS. 10F through 10I accordingly.

As mentioned above, the rectangle area 20 to be used in the above-described formation of symmetrical-structure texture images is determined in the rectangle-area determining process such as that described with reference to FIGS. 4 through 9. Through the process shown in FIGS. 4 through 9, a rectangle area 20 is determined in a given original texture image such as that 21 shown in FIG. 5, the rectangle area 20 of the texture image being one in which color-value dispersion is the minimum one, that is, there is not remarkable image pattern dispersion. Thus, a symmetrical-structure texture image such as any one of those shown in FIGS. 10B through 10I formed using the thus determined area of the texture image is effective as follows. If texture images identical to such a symmetrical-structure texture image are used to cover the desired object surface, it is possible to eliminate/reduced not only the strange appearance due to boundary discontinuities such as described above but also a strange appearance due to a second cause as will now be described. The second cause of the strange appearance is image periodicity such as that in which a same image pattern is repeated on the desired object's surface successively.

However, embodiments of the present invention are not limited to the above first through third embodiments using the process shown in FIGS. 4 through 9. Other embodiments are also possible in the scope of the present invention, the embodiments using none of the process shown in FIGS. 4 through 9 and only using formation of symmetrical-structure texture images such as any one of those shown in FIGS. 10B through 10I using any rectangle area extracted from the given original image 21 as the rectangle area 20 shown in FIG. 10A.

Data representing a symmetrical structure texture image will be stored in the memory 12 and in the external storage device 13 shown in FIG. 3 and will be used in a texture mapping operation such as that in which texture images identical to the symmetrical-structure texture image are used to cover the desired object surface as shown in FIG. 2.

Figure 11:
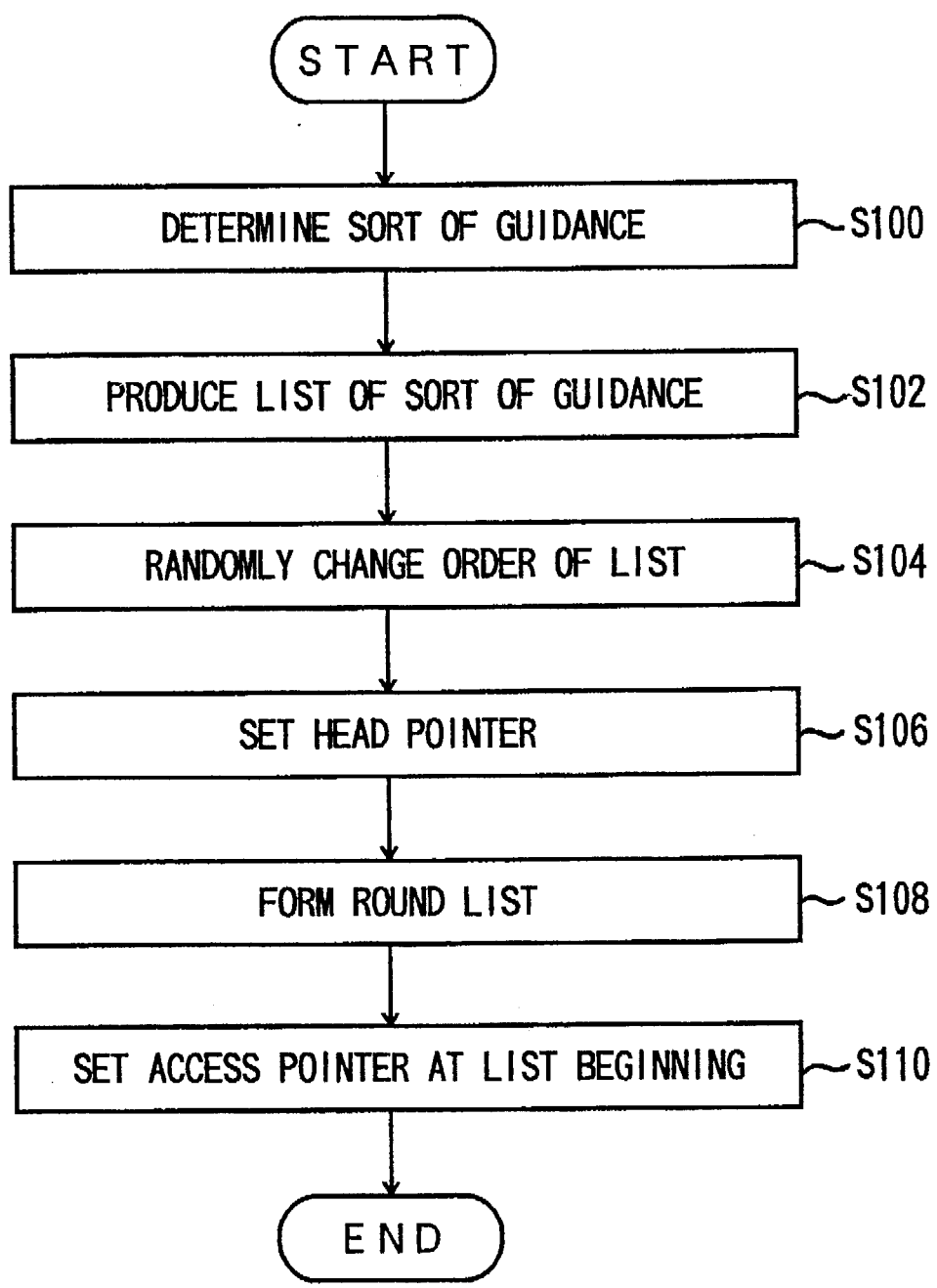
FIG. 11 shows an operation flow of a management-list producing process in the fourth embodiment of the texture mapping method according to the present invention.

With reference to FIG. 11, a method, in the fourth embodiment of the texture mapping method according to the present invention, producing a plurality of lists for managing texture images to be used for a texture mapping process such as that described with reference to FIG. 2. A purpose of such lists is to randomly process given reference texture images so as to obtain a texture image to be used to cover each unit area of a desired object surface. Such random processing of given reference texture images can prevent spatial periodicity from appearing in the surface having been covered by the thus processed and then obtained texture images. Such spatial periodicity may give a strange impression so as to adversely affect reality/naturalness of the thus covered surface, as described above.

Each list of the plurality of lists corresponds to a sort of guidance and consists of cells, each cell determining a particular specification according to which a new texture image to be used to cover each unit area of the desired object surface is obtained as a result of processing one or a plurality of given reference texture images. Examples of such sorts of guidance include a selection guidance of texture images in accordance with which at least one image is selected from among given reference texture images, a rotation guidance in accordance with which the thus obtained new texture image is rotated, a color mixing guidance in accordance with which color values of the thus selected texture images are mixed for each coordinate position in a predetermined mixing ratio so as to determine the color value of the new texture image, and so forth.

A process shown in FIG. 11 is carried out for each list corresponding to a particular guidance. S100 determines a particular sort of guidance from among a plurality of sorts of guidance such as the selecting guidance, the rotation guidance, the color mixing guidance, and so forth. The particular sort of such guidance is represented by a numerical value or the like. S102 produces a list consisting of cells and including at least one guidance specification. S104 randomly changes the order of the cells constituting the list. S106 determines which cell among the cells a head pointer leads. S108 links a beginning of the list with an end of the list so as to form a round list. S110 sets an access pointer to lead the beginning of the list. Thus, the process for a particular list is completed. The lists will be stored in the memory 12 and in the external memory 13. A list produced in the above process will be referred to as a management list.

Figure 12A:
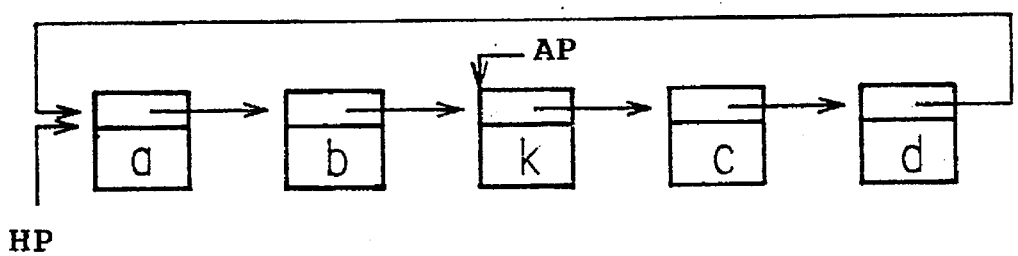
FIGS. 12A, 12B and 12C illustrate the process shown in FIG. 11.
Figure 12B:
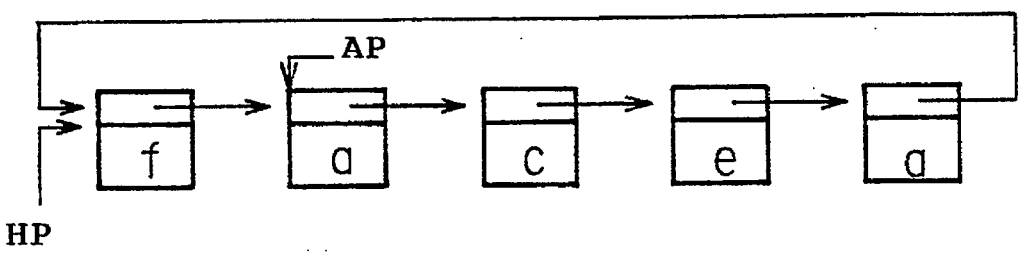
Figure 12C:
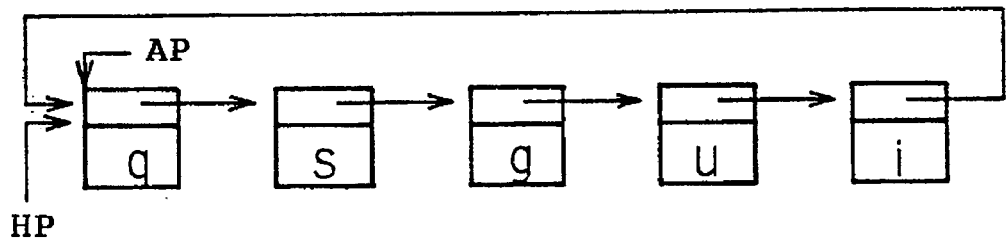

FIGS. 12A, 12B and 12C illustrate management lists 1, 2 and 3 produced by the above process shown in FIG. 11. FIG. 12A, for example, shows a list for rotation guidance such as described above. The list is a round list consisting of cells a, b, k, c and d, a cell lead by the accessing pointer AP changing in the order. The head pointer HP leads the cell a and the access pointer AP leads the cell k. The cells a, b, k, c and d may be ones indicating rotation angle values as shown in FIG. 15A.

Figure 13:
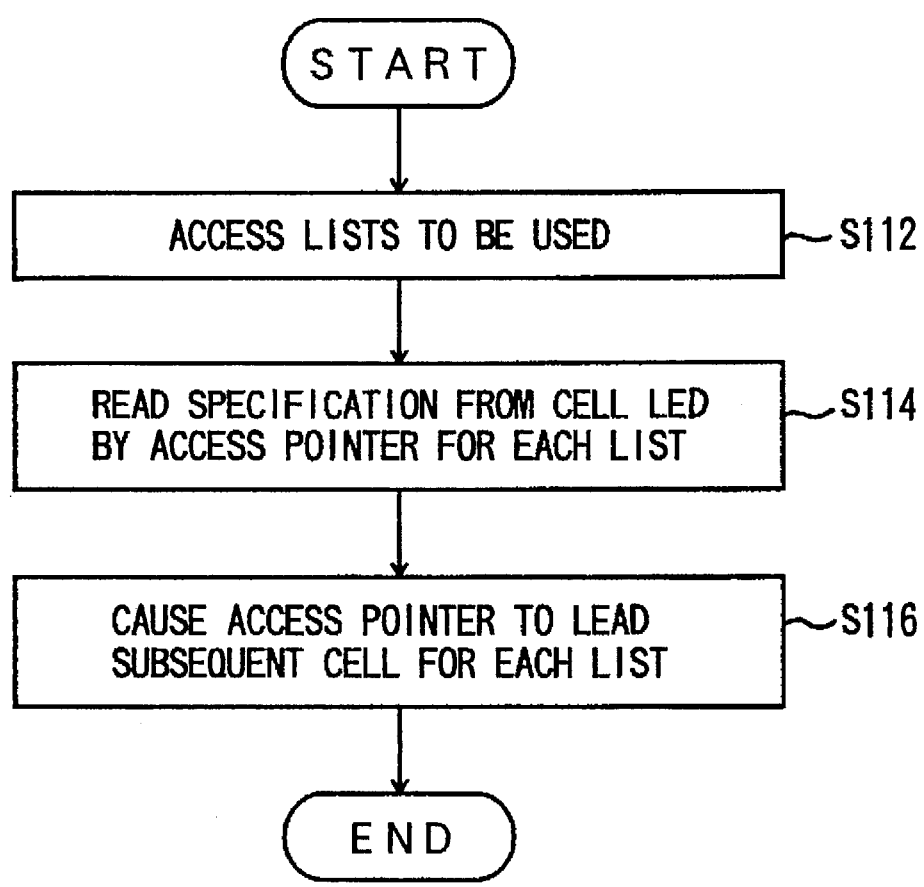
FIG. 13 shows an operation flow of a management list using the process in the above fourth embodiment.

With reference to FIG. 13, a method of using the thus produced lists will now be described. S112 accesses lists to be currently used in the memory 12. S114 reads a particular specification from the cell lead by the access pointer in each list. S116 causes the access pointer to lead the cell subsequent to the cell currently lead by the access pointer for each list. The process has been thus completed.

Figure 14:
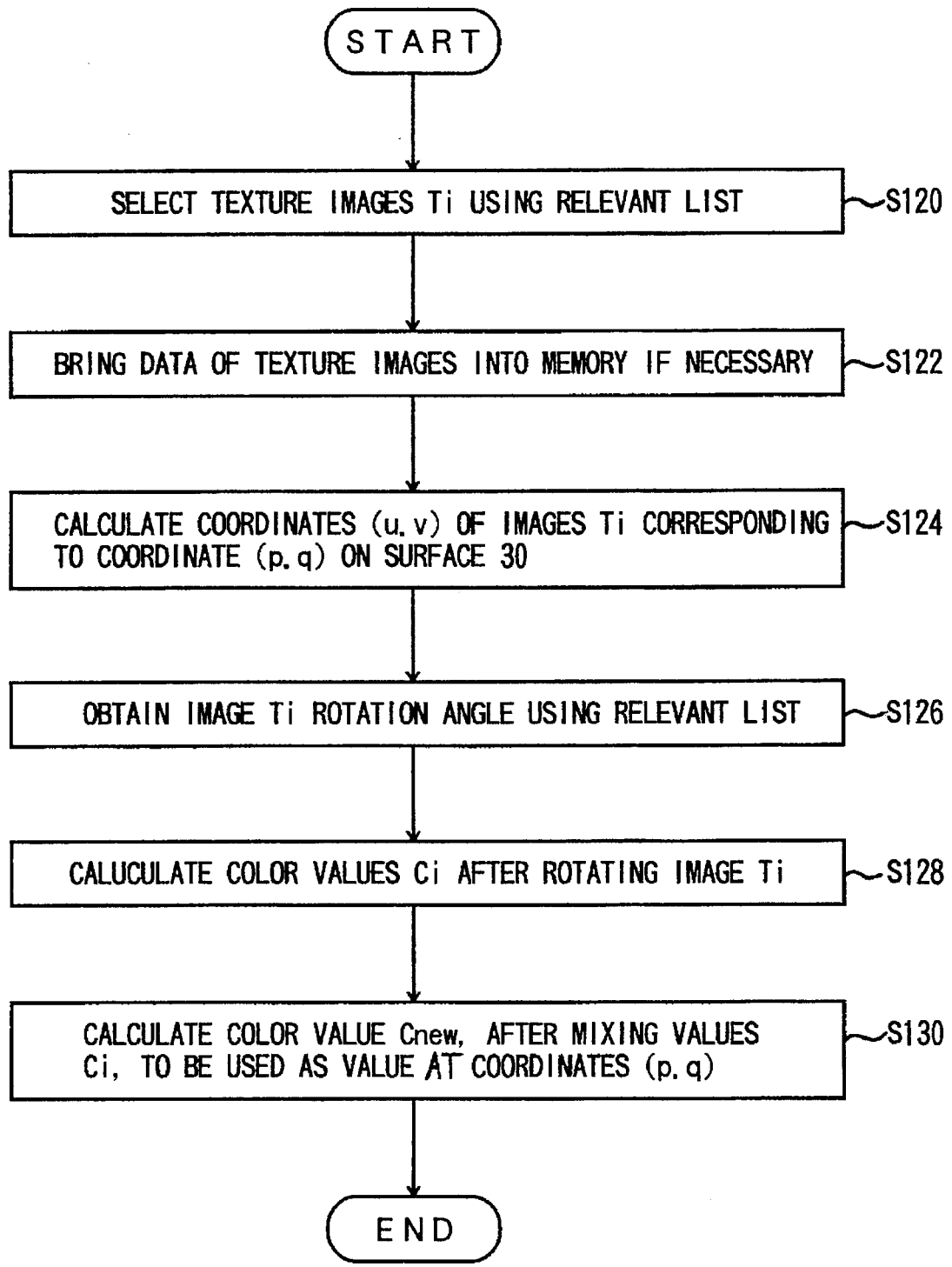
FIG. 14 shows an operation flow of a mapping process using the management list in the above fourth embodiment.

With reference to FIG. 14, an operation flow of a texture mapping process using such management lists will now be described. S120 selects at least one texture image Ti from among given reference texture image in accordance with a management list of a sort of selection guidance such as that described above. For an example of such a management list of a sort of selection guidance, a round list shown in FIG. 15B is assumed to be accessed in S112 shown in FIG. 13 to be used. In the list shown in FIG. 15B, the access pointer leads a cell containing a specification value 5 as shown in the figure. Thus, S114 shown in FIG. 13 reads the above value 5. In this example, another list shown in FIG. 15C is previously provided for indicating particular instructions for each specification value contained in the cells shown in FIG. 15B, FIG. 15C indicates texture image selection according to which a particular texture image is selected from among given reference texture images A, B and C shown in FIGS. 16A, 16B and 16C for example. The image A shown in FIG. 16A has a size of n1 pixels×m1 pixels, the image B shown in FIG. 16B has a size of n2 pixels×m2 pixels and the image C shown in FIG. 16C has a size of n3 pixels×m3 pixels, as shown in the figures. In this case, the image A and the image C, corresponding to the specification value 5 in the list shown in FIG. 15C, are selected as the texture images Ti from among the above images A, B and C accordingly.

Figure 16A:
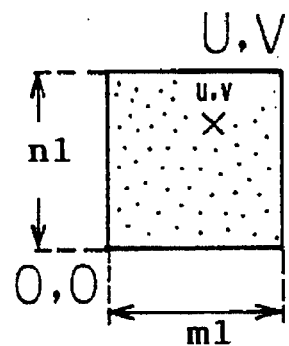
Figure 16B:
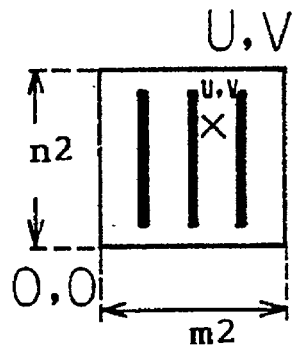
Figure 16C:
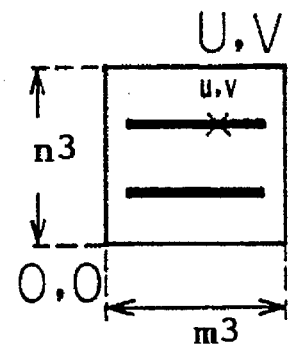

S122 reads data representing the images A and C shown in FIGS. 16A and 16C from the external storage device 13, if the data is not stored in the memory 12, the read data being thus stored in the memory 12. If the data was previously stored in the memory 12, S122 is not carried out and thus S124 is carried out immediately. FIG. 16D illustrates a typical perspective view of an object surface 30 which has been covered by 12 texture images corresponding to rectangle unit areas defined on the surface 30 as shown in the figure. It should be noted that FIGS. 16A through 16D typically, and rather exaggeratedly, indicate patterns of the texture images for the sake of clear description of the features of the relevant embodiments of the present invention. S124 calculates x and y coordinates (u, v) of the texture images Ti corresponding to each set of x and y coordinates (p, q) in a particular rectangle unit area of the surface 30, the rectangle unit area 30a shown in the figure for example covered by the texture images Ti.

S126 obtains rotation guidance for the thus obtained texture images Ti. In this example, a management list shown in FIG. 15A is assumed to be accessed through the S112 shown in FIG. 13 to be used to obtain the rotation guidance. S114 shown in FIG. 13 thus reads a specification value 180 contained in the cell lead by the access pointer AP as shown in the figure. S116 shown in FIG. 13 causes the access pointer AP to lead the subsequent cell, S114 thus reading a specification value 90 from the above subsequent cell thus lead by the access pointer. The thus read specification values 180 and 90 correspond to the rotation angles 180° and 90° by which the above texture images Ti, A and B are rotated.

As a result of the above rotation by 180° and 90° of the texture images Ti, A and B in their own image spaces, the color values at the positions specified by the same coordinates (u, v), in the image spaces, as those calculated through S124 are changed accordingly into new color values Ci. This is because the images are rotated while the coordinates (u, v) are fixed. Such rotation of an image in its image space with a fixed coordinate system can be replaced by rotation of a coordinate system (being one of coordinate transformation technology) with a fixed image in its image space. These two methods have a significantly same effect in this case. Further, it is also possible to replace the coordinate transformation technology by another coordinate transformation technology in the embodiment so as to obtain variants of a given reference texture image. S128 reads the above new color values Ci for the texture images Ti, A and B. S130 obtains a further new color value Cnew as a result of mixing the color values Ci of the texture images Ti, A and B in a predetermined mixing ratio, which may be obtained from a management list for color mixing guidance as that mentioned above, if S120 has selected a plurality of texture images Ti. The thus obtained color value Cnew is used as the color value at the above coordinates (p, q) at the rectangle unit area 30a on the surface 30. Thus, the texture images Ti are mapped on the area 30a on the surface 30.

Thus, all coordinates (p, q) representing all positions have their own color values in the rectangle unit area 30a on the surface 30 after the above process shown in FIG. 14 has been performed for all the coordinates (p, q). However, among all the steps shown in FIG. 14, S120, S122 and S126 are steps common among the all coordinates (p, q) within such a particular rectangle unit area as that of 30a in this case. Thus, S120, S122 and S126 need not to be repeated for a particular rectangle unit area. As a result of the appropriate process, the entire rectangle unit area 30a shown in FIG. 16D has been mapped. In the mapping, the selected images Ti, A and C have been combined so that these images are superimposed on one another. The thus mapped area on the surface 30, the area 30a containing the position (p, q) shown in FIG. 16D, has characters of the images A and C. That is, as shown in the figure, the area has the character of the image A, in that the entirety of the image is uniformly dotted. Although S128 obtains the new color value Ci for the image A as a result of rotating the image, the color value is substantially fixed due to such a rotation symmetrical character as that an entirety of the area is uniformly dotted. Further, the area has the character of the image C, in that two bold parallel lines are present at a middle of the image. According to the image rotation by 90° through S128, the original character of horizontal parallel lines shown in FIG. 16C has been changed into vertical parallel lines shown in FIG. 16D. The above process of S120, S122, S124, S126, S128 and S130 is performed for all rectangle unit areas, 12 in the FIG. 16D example, so that the desired object surface 30 is mapped. S120 and S122 are performed each time when mapping of a particular rectangle unit area among the 12 areas in the FIG. 16D example defined on the surface 30 is started.

In this embodiment, it is also possible that S120 selects texture images Ti to be used to map a particular rectangle unit area so that the number and selection of the texture images Ti depends on the coordinates (p, q) of the particular rectangle unit area.

Thus, the method in the fourth embodiment selects texture images from among given reference texture images for particular positions/coordinates on a desired object surface, rotates the thus selected texture images or transforms a spatial coordinate system of the thus selected images, and mixes the characters of the thus selected images. As a result, it is possible to easily obtain many variants of the given reference texture images being different from but similar to the given reference texture images. As described above, it is preferable that the texture images to be used to cover an object surface are so different from one another that undesirable periodicity can be prevented and also that the texture images are so similar to one another that undesirable conspicuousness can be prevented from occurring in the surface covered by the texture images.

Further, the method in the fourth embodiment uses predetermined management lists, such as those described above, indicating sorts of guidance according to which certain images are selected from among given reference texture images, the thus selected images undergo the image rotation/coordinate transformation and character mixing. Thus, obtaining of many variants as described above can be executed at high speed, since repetition of calculations for obtaining random numbers for the same purpose is eliminated from the process.

Figure 17:
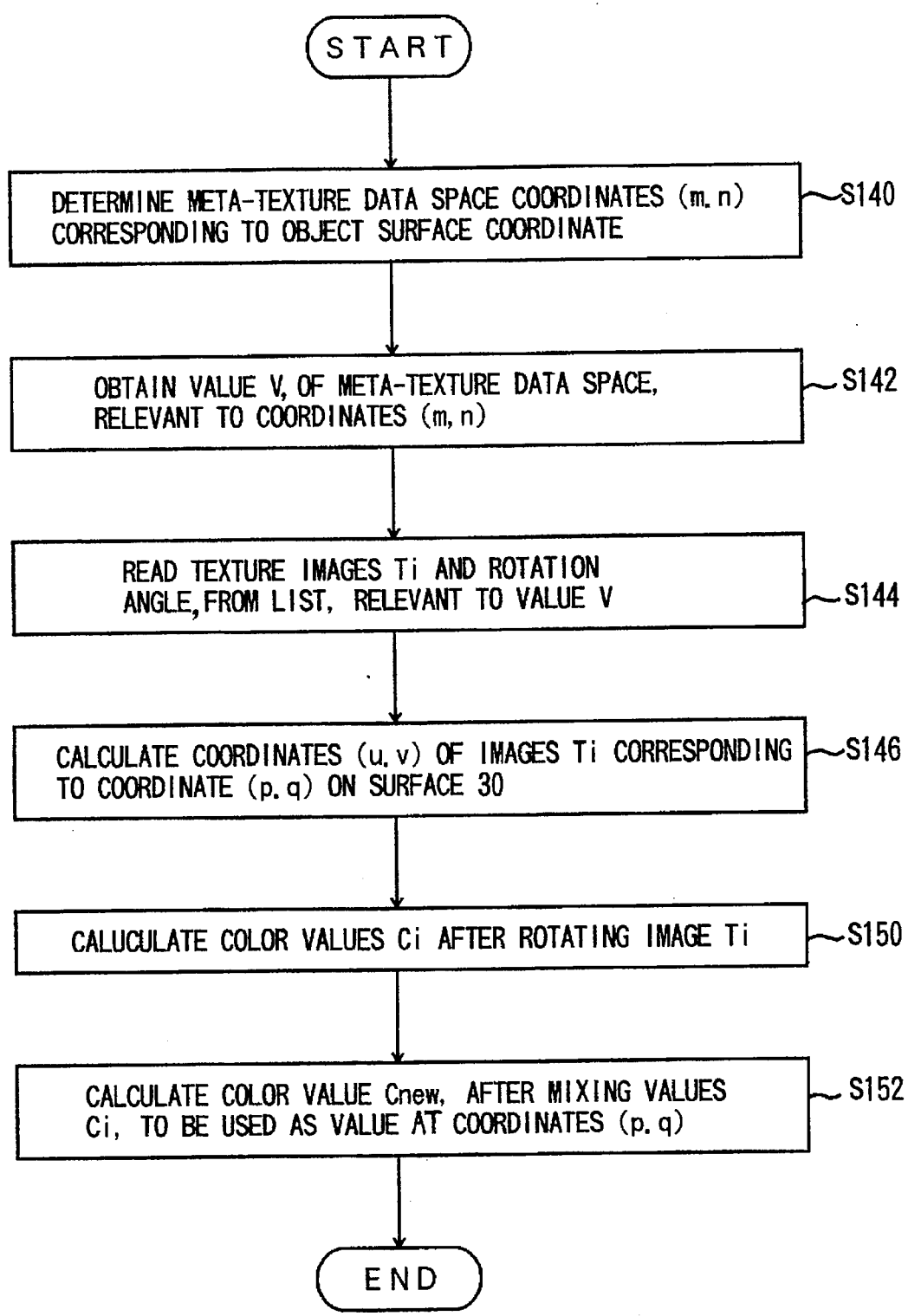
FIG. 17 shows an operation flow of a mapping process using a hierarchic texture-image management data structure in the fifth embodiment of the texture mapping method according to the present invention.
Figure 18A:
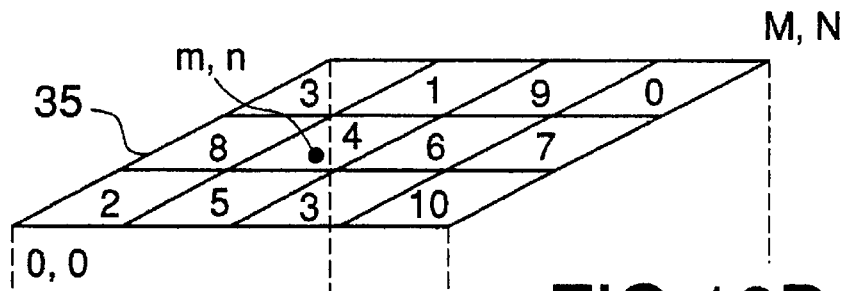
FIGS. 18A and 18B illustrate the process shown in FIG. 17.
Figure 18B:
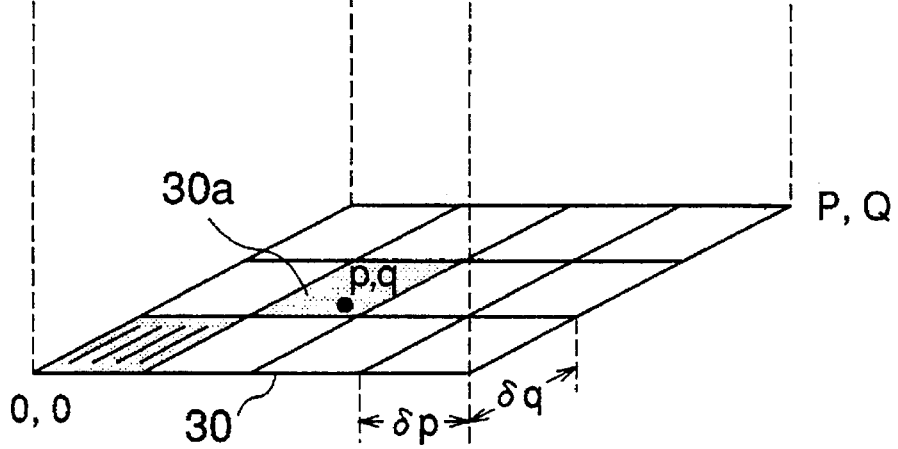

With reference to FIGS. 17, 18A and 18B, a mapping process in the fifth embodiment of the texture mapping method according to the present invention will now be described. The mapping process in the fifth embodiment uses a hierarchical texture-image management method in which data is previously provided, the data controlling as to how texture images are selected from given reference texture images and the thus selected texture images are processed before being used to map a desired object surface. Such data will be referred to as meta-texture data. Such meta-texture data has a structure of a data space being referred to as a meta-texture data space such as the space 35 shown in FIG. 18A, showing a perspective view of a texture-image controlling principle. Such meta-texture data space is set above a desired object surface such as that 30, on which texture images will be mapped, as shown in FIG. 18A, so that a two-rank hierarchy consisting of the meta-texture data space 35 and the desired object surface 30 is formed. Since the method in the fifth embodiment uses a texture-image controlling principle such as that shown in FIG. 18A, the method is referred to as the hierarchical texture-image management method. As shown in FIG. 18A, in this example, the object surface 30 is defined into 12 rectangle unit areas, each area having a size of $\delta p \times \delta q$. The corresponding meta-texture data space 35 consists of corresponding 12 rectangle unit areas, each area having a particular value V. Further, a reference list such as that 36 shown in FIG. 18B is previously provided consisting management guidance specifications itemized for the particular values V acting as entry numbers for the list 36. Letters contained in lines of an image selection column indicate texture images to be selected from among the given reference texture images and numerals contained in lines of a rotation angle column indicate rotation angles (°) in the list shown in FIG. 18B. With reference to FIG. 17, S140 determines x and y coordinates (m, n) in the meta-texture data space 35 corresponding to coordinates (p, q) in a rectangle unit area 30a for example on the desired object surface 30, as shown in FIG. 18A. S142 determines a rectangle unit area including the coordinates (m, n) in the meta-texture data space 35 so as to obtain the value V relevant to the thus determined particular rectangle unit area in the meta-texture data space. In this example shown in FIG. 18A, the value V relevant to the determined area in the meta-texture data space 35 is 4 as shown in the figure. S144 reads guidance specifications relevant to the obtained value V from the list 36. The guidance specifications include the data for selecting the texture images Ti from among the given reference texture images and data for rotating the thus selected texture images Ti. In this example, the value 4 leads the guidance specifications, as shown in FIG. 18B, in that a reference texture image A is selected and the image A is rotated by 180°. S146 determines coordinates (u, v), of each of the texture images Ti in its image space, corresponding to the above coordinates (p, q) in the rectangle unit area 30a.

S150 and S152 are identical to S128 and S130 shown in FIG. 14, a description thereof being thus omitted. Thus, particular rectangle unit areas including the area 30a on the object surface 30 have been mapped after the process shown in FIG. 17 has been executed. However, since S140, S142 and S144 are common for a particular rectangle unit area such as that 30a, these steps need not to be repeated for the particular rectangle unit.

The above-described method in the fifth embodiment is substantially identical to the method in the fourth embodiment, excepting that the method in the fifth embodiment uses the meta-texture data space such as that 35 and the associated list such as that 36 instead of using the guidance lists such as those shown in FIGS. 15A, 15B and 15C. Use of such a hierarchical texture image management method enables ease in management of even a complicated texture mapping process, flexible management thereof being thus realized. This is because such a management can be made for processing such meta-texture data and an associated list independently of an actual desired object surface.

With reference to FIG. 19, an adaptable mapping process in the sixth embodiment of the texture mapping method according to the present invention will now be described. The adaptable mapping process uses the method in the fifth embodiment described above with reference to FIGS. 17, 18A and 18B. In addition, the adaptable mapping process uses an importance level P previously set for each value V such as the value V used in the method in the fifth embodiment. The importance level P indicates how important it is to map a relevant unit area on a desired object surface with a texture image. As an example of such importance, if a road surface is the desired object surface to be mapped, the road extending from a near side to a remote side in a virtual space displayed on a screen, it is not important to map the road surface at the remote side since the road at the remote side is expressed on the screen as a very narrow strip. Thus, it can be said that such an area of an object surface has a very small importance to be mapped. In such a case, the importance level may be determined to be a lower level (small value) for the relevant area. Thus, such an adaptable mapping process enables high-speed texture mapping by appropriately eliminating mapping process of such an unimportant area. Further, it is also possible in such a principle according to the present invention to control a mapping manner appropriate to characteristics of the desired object surface by previously giving such an importance level P appropriate to each unit areas constituting the desired object surface so as to appropriately eliminate/reduce the relevant mapping process.

S160 and S162 are identical to S140 and S142 shown in FIG. 17, a description thereof being thus omitted. A guidance list such as the list 36 shown in FIG. 18A is previously provided for particular values V acting as entry numbers for the list. The guidance list used in the sixth embodiment includes an importance level column containing importance levels P for the particular values V in addition to the image selection column and the rotation angle column as described above with reference to FIG. 18B. S164 reads the importance level P, relevant to the value V obtained through S162, from the above described guidance list, in addition to reading the texture images and the rotation angle relevant to the value V from the same list. S166 determines whether the thus read importance level P is smaller than a predetermined threshold level A. If P<A in S166, no texture mapping process is performed on the coordinates (p, q) of the desired object surface and the process for the coordinates (p, q) is terminated. If P≧A in S166, S168 maps the coordinates (p, q) of the desired object surface in a manner according to the importance level P. However, it is possible that S168 maps the coordinates (p, q) of the desired object surface according to S146 through S152 shown in FIG. 17 independently of the importance level P as long as S166 determines P≧A.

As described above, if a rectangle unit area corresponds to a remote object in a virtual space displayed on a screen for example, the importance level P for the unit area is previously determined to have the small value. Thus, S166 determines that is P<A, then no texture mapping is performed on the unit area. Further, it is possible to implement the adaptable mapping method in the sixth embodiment so that S168 controls/changes a manner, in accordance with which the relevant coordinates of the object surface is mapped, according to the importance level P as described above.

Further, it is possible that such a principle of the adaptable mapping process in the sixth embodiment is used independently of the above hierarchically controlled mapping method in the fifth embodiment. That is, a texture image may be determined according to any other method to cover a unit area of the desired object surface and such an importance level according to the above principle is determined for the unit area. According to the thus determined importance level, the thus determined texture image is appropriately processed before being used to map the unit area.

Further, it is possible to combine any of the above-described methods in the fourth, fifth and sixth embodiments with any part of the above process in the first, second and third embodiments. That is, any of the methods in the fourth, fifth and sixth embodiments may use any part of a rectangle area of an original texture image determined through any part of the rectangle area determining process in the first, second and third embodiments, as a reference texture image. Texture images identical to the reference texture image may be directly used to cover a desired object surface in any of the mapping methods in the fourth, fifth and sixth embodiments. Further, such a rectangle area of an original texture image is first used to form a symmetrical-structure texture image as described with reference to FIGS. 10A through 10L. The thus formed symmetrical-structure texture image is used as a reference texture image. Texture images identical to the reference texture image may be directly used to cover the desired object surface in any of the mapping methods in the fourth, fifth and sixth embodiments.

Further, the present invention is not limited to the above described embodiments, and variations and modifications may be made without departing from the scope of the present invention.

What is claimed is:

1. A texture mapping method for rendering graphical images, said method comprising the steps of:

extracting a fragment of an image as a first element image having a predetermined pattern from a given texture;

forming a texture unit by providing a second element image having a pattern which is axis-symmetrical to said predetermined pattern of said first element image with respect to a symmetrical axis which comprises a predetermined side of the first element image and a predetermined side of said second element image, then connecting said first element image and said second element image with each other, wherein corresponding sides of the first and second element images are adjacent to one another, thereby forming an area rectangle image which has an axis symmetrical configuration such that a pattern of said area rectangle image is axis-symmetrical to a symmetrical axis which corresponds to a center axis of said area rectangle image, said area rectangle image also comprising a boundary line of said first and second element images therein, wherein said connecting step is performed to render an inconspicuous border between adjacent first and second element images on an electronically rendered image.

2. The texture mapping method according to claim 1, wherein said predetermined pattern comprises a texture image.

3. The texture mapping method according to claim 1, further comprising a placing step placing the first and second element images from side to side so as to cover a desired surface.

4. The texture mapping method according to claim 3, wherein said method is a method of processing data representing said predetermined pattern, said first and second element images, and the desired surface.

5. The texture mapping method according to claim 1, wherein:

said first element image has a rectangle shape;

said connecting step connects the first and second element images with one another so that a side of the first element image meets and aligns with a corresponding side of the second image, and also so that a side of a third image meets a corresponding side of a fourth image at all adjacent parts of the images.

6. The texture mapping method according to claim 1, wherein said fragment extracted from said given texture has a rectangle shape; and said connecting step connects the second element image as a symmetrical fragment symmetrical to the first element image extracted from said predetermined pattern and connects said symmetrical fragment with said first element image so that they meet at all sides corresponding to their symmetry axis, thereby forming an original texture unit.

7. The texture mapping method according to claim 6, wherein said connecting step further forms a symmetrical texture unit symmetrical to the original texture unit, formed as a result of connecting said symmetrical fragment with said first element image, and connects said symmetrical texture unit with said original texture unit so that they meet at all sides corresponding to their symmetry axis.

8. The texture mapping method according to claim 5, wherein:

said predetermined pattern comprises a color texture image; and said extracting step extracts said first element image at a position of said predetermined pattern so that a color different between color distributions at opposite sides of the first element image is a minimum one.

9. The texture mapping method according to claim 5, wherein:

said predetermined pattern comprises a color texture image; and said extracting step extracts said first element image at a position of said predetermined pattern so that a color variance taken for a color distribution in the first image is a minimum one.

10. The texture mapping method according to claim 5, wherein:

said predetermined pattern comprises a color texture image; and said extracting step extracts said first image at a position of said predetermined pattern so that a sum of a color difference between the color distributions at opposite sides of the thus extracted and a color variance taken for a color distribution in the first image is a minimum one.

11. A texture mapping method for rendering graphical images, said method comprising:

successively moving a rectangle area of an original texture image in a plurality of successive moving steps;

obtaining image data at each position of the rectangle area in each successive moving step, wherein a color difference between color distributions at each successive moving step is a minimum;

comparing the image data for each successive moving step to each other, thereby determining a position of the rectangle area in the original texture image, such that a final rectangle area can be obtained, said final rectangle area including optimum image data defined by the image data of the original texture image at a final position;

mapping a desired object surface with the image data corresponding to one of the original texture image, image data of each successive moving step, and the optimum image data.

12. A texture mapping method for rendering graphical images, said method comprising:

successively moving a rectangle area of an original texture image in a plurality of successive moving steps;

obtaining image data at each position of the rectangle area in each successive moving step, wherein a color variance between image data at each position of the rectangle area is a minimum, said color variance corresponding to a color distribution of the rectangle area;

comparing the image data for each successive moving step to each other, thereby determining a position of the rectangle area in the original texture image, such that a final rectangle area can be obtained, said final rectangle area including optimum image data defined by the image data of the original texture image at a final position;

mapping a desired object surface with the image data corresponding to one of the original texture image, image data of each successive moving step, and the optimum image data.

13. A texture mapping method for rendering graphical images, said method comprising:

successively moving a rectangle area of an original texture image in a plurality of successive moving steps;

obtaining image data at each position of the rectangle area in each successive moving step, wherein a sum of a color difference between color distributions at opposite sides of the rectangle area at each successive moving step and a color variance for a color distribution in each successive moving step is minimum;

comparing the image data for each successive moving step to each other, thereby determining a position of the rectangle area in the original texture image, such that a final rectangle area can be obtained, said final rectangle area including optimum image data defined by the image data of the original texture image at a final position;

mapping a desired object surface with the image data corresponding to one of the original texture image, image data of each successive moving step, and the optimum image data.

14. A texture mapping method for rendering graphical images, said method comprising:

determining a guidance for modifying texture units from a plurality of guidance types;

a selecting step for selecting at least two texture units, from among a previously provided plurality of texture units, according to a position of an area of a desired object surface;

randomly changing an order of appearance of said at least two textured units;

setting a head pointer to a first of said at least two texture units;

linking a first of said at least two texture units to a last of said at least two texture units, thereby forming a round list of texture units;

setting an access pointer to said first texture unit, wherein an appearance of said texture units are modified according to said position of said area of said desired object surface, wherein the desired object surface is rendered on a display.

15. The texture mapping method according to claim 14, further comprising a step of accessing the first texture unit and placing said first texture unit at said area of said desired object surface.

16. The texture mapping method according to claim 14, wherein:

said selecting step selects the first of said at least two texture units, from said round list;

moving data representing said first texture unit into memory;

determining coordinates of the first texture unit based upon a position of the area of the desired object surface;

modifying said first image based upon said guidance;

determining color values, and rendering the desired object surface on a display.

17. The texture mapping method according to claim 14, wherein said selecting step and said modifying step according to the position of the area of said desired object surface are carried out in accordance with a predetermined management list.

18. The texture mapping method according to claim 14, further comprising a meta-texture data determining step determining meta-texture data according to the position of the area of said desired object surface; and wherein:

said selecting step selects said at least one texture unit, from among said previously provided plurality if texture units, according to said meta-texture data; and said modifying step modifies the appearance of said texture unit according to said meta-texture data.

19. The texture mapping methods according to claim 14, further comprising a mixed step mixing texture units comprising at least two texture units among texture units selected by said selecting step and texture units modified by said modifying step.

20. A texture mapping method for rendering graphical images, said method comprising:

determining a meta-texture data space based upon a position of an area of a desired object;

obtaining a value of the meta-texture data space based upon coordinates of the meta-texture data space;

obtaining at least one texture image and a rotation thereof from a predetermined list;

calculating coordinates of said at least one texture image based upon the area of the desired object surface;

rotating the at least one texture image;

calculating color values of the at least one texture image;

rendering the at least one texture image on a display.

21. The texture mapping method according to claim 20, further comprising the steps of:

determining an importance level of the texture image;

comparing the importance level of the texture image to a threshold level;

mapping the at least one texture unit based upon the importance level when the importance level exceeds the threshold level.

22. A method of producing a symmetrical configuration rectangle image to be used as a texture unit, comprising the steps of:

a) providing a first element rectangle image having a predetermined pattern;

b) providing a second element rectangle image having a pattern which is axis-symmetrical to said predetermined pattern of said first element rectangle image with respect to a symmetrical axis which comprises a predetermined side of said first element rectangle image and a predetermined side of said second element rectangle image; and c) connecting at least one pair of said first element rectangle image and said second element rectangle image with one another wherein corresponding sides of element rectangle images are adjacent to one another, and a thus-connected and thereby even-number times area rectangle image has an axis symmetrical configuration such that the pattern of said even-number times area rectangle image is axis symmetrical with respect to a symmetrical axis which corresponds to a center axis of said even-number times area rectangle image, said even-number times area rectangle image also comprising a boundary line of said adjacent element rectangle images therein.

* * * * *